United States Patent
Morey et al.

(10) Patent No.: US 11,118,787 B2
(45) Date of Patent: Sep. 14, 2021

(54) IMPINGEMENT OVEN

(71) Applicant: John Bean Technologies Corporation, Chicago, IL (US)

(72) Inventors: Owen Eugene Morey, Huron, OH (US); Ramesh M. Gunawardena, Solon, OH (US); Brian P. Westcott, Sandusky, OH (US); Scott M. Kane, Sandusky, OH (US); John D. Woodburn, Sandusky, OH (US); Scott E. Stang, Monroeville, OH (US)

(73) Assignee: JOHN BEAN TECHNOLOGIES CORPORATION, Chicago, IL (US)

( * ) Notice: Subject to any disclaimer, the term of this patent is extended or adjusted under 35 U.S.C. 154(b) by 220 days.

(21) Appl. No.: 15/274,862

(22) Filed: Sep. 23, 2016

(65) Prior Publication Data
US 2017/0082300 A1 Mar. 23, 2017

Related U.S. Application Data

(60) Provisional application No. 62/222,704, filed on Sep. 23, 2015.

(51) Int. Cl.
*F24C 15/32* (2006.01)
*A47J 37/04* (2006.01)
(Continued)

(52) U.S. Cl.
CPC ............ *F24C 15/322* (2013.01); *A21B 1/245* (2013.01); *A21B 1/48* (2013.01); *A23L 5/17* (2016.08);
(Continued)

(58) Field of Classification Search
CPC .... F24C 15/232; F24C 15/322; F24C 15/325; F24C 15/327; H05B 6/6485;
(Continued)

(56) References Cited

U.S. PATENT DOCUMENTS 3,621,586 A 11/1971 Meyer
4,438,572 A 3/1984 Kaminski
(Continued)

FOREIGN PATENT DOCUMENTS

AL 0 312 335 A1 4/1989
EP 0 089 762 A1 9/1983
(Continued)

OTHER PUBLICATIONS

International Search Report and Written Opinion dated Jan. 13, 2017, issued in corresponding International Application No. PCT/US2016/053542, filed Sep. 23, 2016, 15 pages.
(Continued)

*Primary Examiner* — Dana Ross
*Assistant Examiner* — Michael S. Poetzinger
(74) *Attorney, Agent, or Firm* — Christensen O'Connor Johnson Kindness PLLC

(57) ABSTRACT

An impingement oven (40) includes an upper housing structure (46) forming the exterior of the upper half of the impingement oven and a lower housing structure (48) to mate with the upper housing structure. An interior impingement housing (62) is positioned interior to the upper and lower housing structures (46) and (48). A conveyor (60) extends through the interior impingement housing (62). The inside surfaces of the upper and lower housing structures (46) and (48) cooperate with the interior impingement housing (62) to define upright supply chambers (80a) and (80b) on opposite sides of the impingement oven to direct cooking medium downwardly upon the work products being carried by the conveyor and also upwardly through the porous belt of the conveyor, thereby to thermally process the work products being carried on the conveyor.

21 Claims, 22 Drawing Sheets

(51) Int. Cl.
*A23L 5/10* (2016.01)
*F25D 13/06* (2006.01)
*A21B 1/48* (2006.01)
*A21B 1/24* (2006.01)

(52) U.S. Cl.
CPC .......... *A47J 37/044* (2013.01); *F25D 13/067* (2013.01); *A23V 2002/00* (2013.01)

(58) Field of Classification Search
CPC ......... H05B 6/6473; A21B 1/245; A21B 1/26; A21B 1/28; A21B 1/48; A23L 5/17
USPC ......... 219/391, 400; 99/474; 126/21 A, 15 A
See application file for complete search history.

(56) References Cited

U.S. PATENT DOCUMENTS

| | | |
|---|---|---|
| 4,520,575 A | 6/1985 | Holmes et al. |
| 4,626,661 A | 12/1986 | Henke |
| 4,831,238 A | 5/1989 | Smith et al. |
| 4,834,063 A | 5/1989 | Hwang et al. |
| 4,951,648 A | 8/1990 | Shukla et al. |
| 4,965,435 A | 10/1990 | Smith et al. |
| 5,131,841 A | 7/1992 | Smith et al. |
| 5,826,496 A * | 10/1998 | Jara ........................ A21B 1/245 99/443 C |
| 5,964,044 A | 10/1999 | Lauersdorf et al. |
| 6,146,678 A | 11/2000 | Caridis et al. |
| 6,320,165 B1 * | 11/2001 | Ovadia .................. A21B 1/245 126/21 A |
| 6,526,961 B1 | 3/2003 | Hardenburger |
| 6,572,911 B1 | 6/2003 | Corcoran et al. |
| 6,880,545 B2 | 4/2005 | Heber et al. |
| 6,933,473 B2 | 8/2005 | Henke et al. |
| 7,220,944 B2 * | 5/2007 | Miller .................... A21B 1/245 126/21 A |
| 7,258,881 B2 | 8/2007 | Jones et al. |
| 7,343,912 B2 | 3/2008 | Jones et al. |
| 2003/0051723 A1 * | 3/2003 | Gunawardena ........ A21B 1/245 126/21 A |
| 2006/0163238 A1 * | 7/2006 | Miller .................... A21B 1/245 219/388 |

FOREIGN PATENT DOCUMENTS

| | | |
|---|---|---|
| EP | 1 905 305 A1 | 4/2008 |
| GB | 697086 | 9/1953 |
| GB | 1566799 | 5/1980 |
| JP | 2000-028251 A | 1/2000 |
| JP | 2001-120243 A | 5/2001 |

OTHER PUBLICATIONS

International Preliminary Report on Patentability dated Dec. 18, 2017, issued in corresponding International Application No. PCT/US2016/053542, filed Sep. 23, 2016, 24 pages.

* cited by examiner

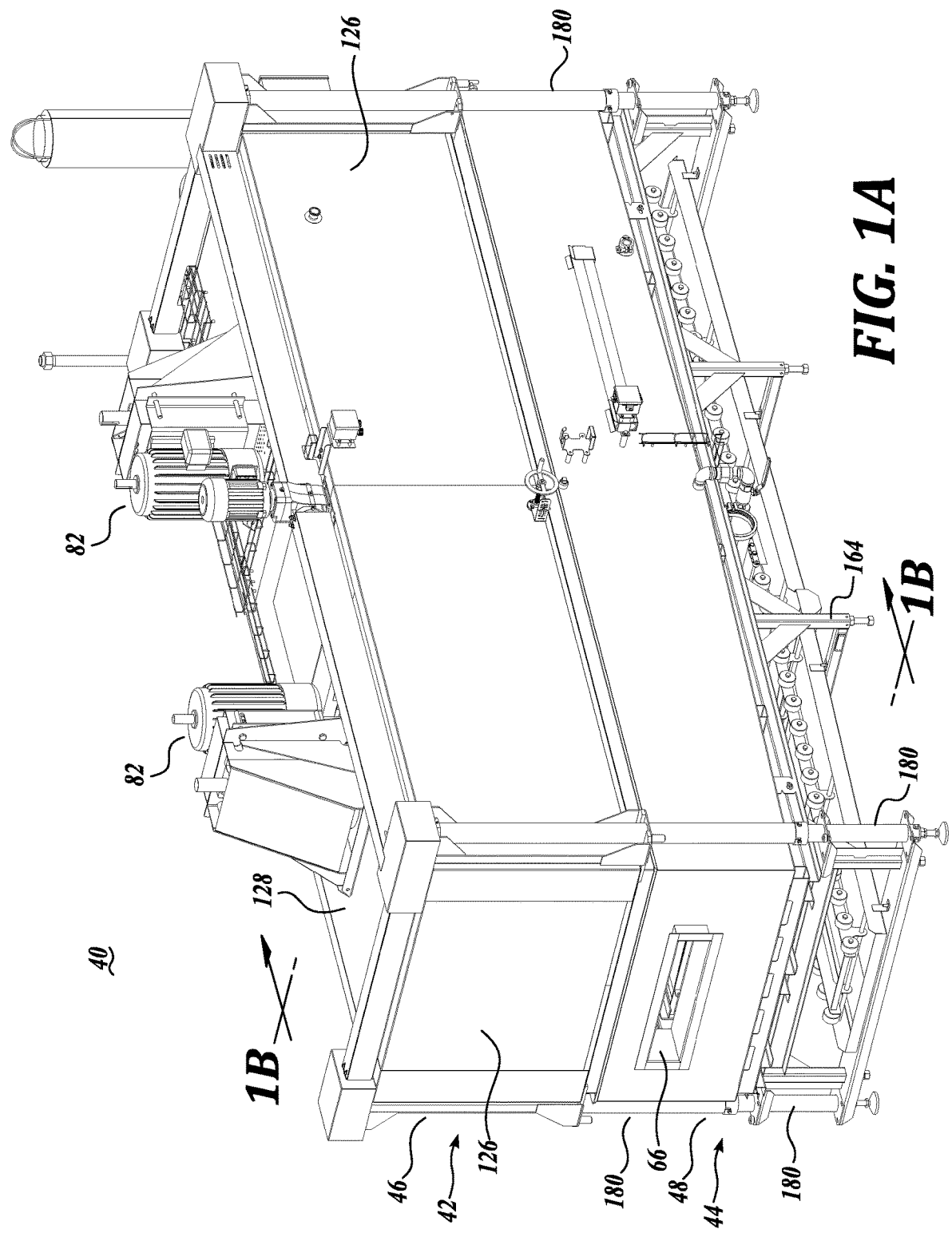

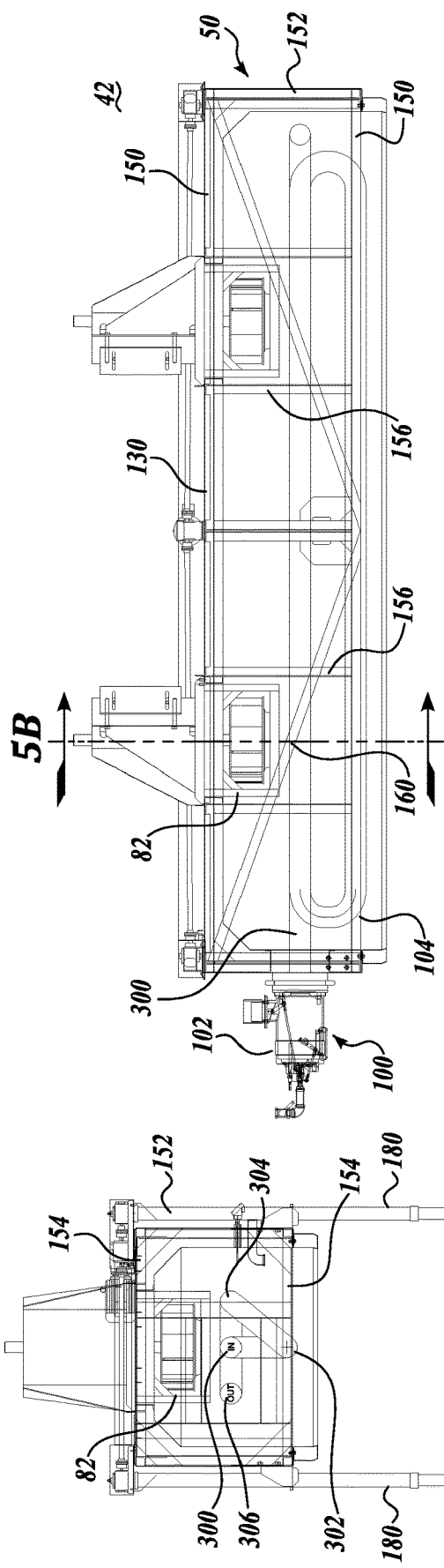
FIG. 5A
FIG. 5B
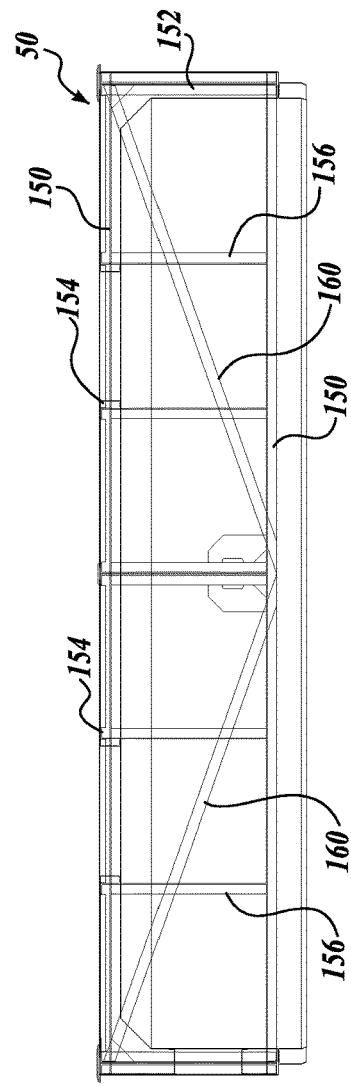
FIG. 5C
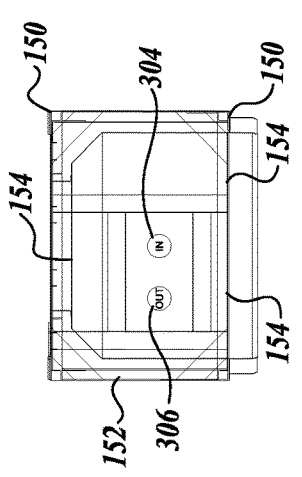
FIG. 5D

ALIGNED, TANDEM

STAGGERED, TANDEM

ALIGNED, INDIVIDUAL

STAGGERED, INDIVIDUAL

ALIGNED,
TANDEM
W/ PLENUM

STAGGERED,
TANDEM
W/ PLENUM

ALIGNED,
INDIVIDUAL
W/ PLENUM

STAGGERED,
INDIVIDUAL
W/ PLENUM

IMPINGEMENT OVEN

CROSS-REFERENCE TO RELATED APPLICATION

This application claims the benefit of U.S. Provisional Application No. 62/222,704, filed Sep. 23, 2015, the disclosure of which is hereby expressly incorporated by reference herein it its entirety.

BACKGROUND

The present disclosure relates generally to ovens for cooking or thermally processing foods or other work products that travel on a conveyance system through the oven. A heated gaseous cooking medium is applied to (impinged upon) the food products or other work products at relatively high velocity, typically from both above and beneath the conveyor, which is of open construction. The cooking medium is forced at high velocity, and at a substantial mass flow rate, toward the top and bottom surfaces of the conveyor in thin transverse sheets. The gaseous cooking medium is heated and circulated through the oven at high velocity to perform the cooking operations. The cooking medium is then recirculated for reheating and then distributed back to the food products or other products in a continuous, repetitive fashion.

Typically, the heated cooking medium is circulated by a fan in a vertical plenum extending downwardly along one side of the conveyor. Finger ducts or other distribution structures extend transversely from the plenum to overlie and underlie the conveyor. The sheets of cooking gas flow from the finger ducts downwardly onto the food product or other product, as well as upwardly through the porous conveyor belt to the underside of the food product or other product.

One difficulty with existing impingement ovens is achieving a uniform distribution of the cooking medium across the conveyor belt. To this end, the distribution ducts have been configured in the form of transverse duct fingers that decrease in cross-sectional volume in the direction away from the plenum. Nonetheless, it has been difficult to achieve an even distribution of the hot cooking medium across the entire width of the conveyor. This problem becomes more acute for wider conveyor belts. Thus, the uneven distribution of cooking medium constitutes an impediment to increasing the width of the conveyor belt when desiring to achieve a higher food product throughput.

The non-uniform distribution of the impingement cooking medium can have other detrimental effects. A steam chamber may be located upstream from the impingement oven, wherein the food product or other work product is heated by the application of steam. When non-uniform distribution of cooking gas flows occurs across the conveyor, it can combine with velocity pressure from the circulation fan to produce irregular cooking medium flow patterns at the interfaces between the oven and the steam chamber. This can adversely influence the heat transfer to the work pieces in the steam chamber which occurs prior to the impingement oven process. For example, irregular condensation flow pattern within the steam chamber can cause larger temperature deviations, which can carry through into the impingement oven and result in temperature deviation in the work pieces at the discharge from the oven. Therefore, having a uniform flow distribution at the impingement oven interface provides a more effective containment of the steam in the steam chamber and of the impingement medium in the impingement oven at the interface. This can result in more uniform work piece temperatures across the conveyor belt width to transfer into and out of the impingement oven.

The impingement ovens of the present disclosure seek to address the above problems with prior impingement oven systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An impingement apparatus for thermally processing work products, including food products, while being transported on a conveyor with a thermal processing medium, comprising:
  an outer housing having side portions;
  an impingement housing disposed within the outer housing, the impingement housing having side portions;
  the side portions of the outer housing and the side portions of the impingement housing are configured to cooperatively define supply chambers extending along both exterior sides of the impingement housing and corresponding interior sides of the outer housing for circulation of the thermal processing medium; and
  distribution chambers extending laterally from the two supply chambers to direct the thermal processing medium toward the conveyor.

In accordance with a further aspect of the present disclosure, the distribution chambers are in the form of distribution ducts that reduce in cross-sectional area in the direction away from the supply chambers. Also, the distribution ducts are in fluid flow communication simultaneously with the two supply chambers. Further, the distribution ducts are also in fluid flow communication with chambers upstream from the impingement apparatus and/or downstream from the impingement apparatus.

In a further aspect of the present disclosure, the distribution chambers include upper distribution ducts positioned above the conveyor, and lower distribution ducts positioned beneath the conveyor. In addition, an adjustable-position diverter controls the portion of the thermal processing medium that enters the upper distribution ducts versus the lower distribution ducts.

In accordance with a further aspect of the present disclosure, the distribution ducts have outlets that expel at least one thin wall of thermal processing medium extending across the conveyor for directing thermal processing medium toward the conveyor.

In accordance with a further aspect of the present disclosure, a plurality of distribution ducts are arranged as a unit along a longitudinal cassette structure, the cassette structure having side walls forming a part of the impingement housing. The cassette structure is positionable into and removable from the impingement apparatus.

In accordance with a further aspect of the present disclosure, the distribution chambers include distribution ducts disposed above the conveyor and a plenum chamber positioned beneath the conveyor, both the distribution ducts and the plenum chamber are in thermal processing medium flow communication with the supply chambers. In addition, adjustable position diverters are provided that are operable to control the proportion of thermal processing medium that enters the distribution ducts versus the proportion of thermal processing medium that enters the lower plenum chamber.

In accordance with a further aspect of the present invention, the lower plenum chamber includes one or more outlets that direct the thermal processing medium in one or more streams toward the conveyor. Further, the lower plenum chamber is substantially open to the two supply chambers.

In accordance with a further aspect of the present invention, a circulation fan circulates thermally processing medium through the supply chambers. The circulation fan is disposed between the supply chambers.

In accordance with a further aspect of the present invention, the impingement housing includes an upper housing section and a lower housing section. The impingement apparatus further includes a cassette structure that is structurally separate from the upper and lower impingement housings while defining a portion of the impingement housing positioned between the upper and lower impingement housing sections. The cassette structure comprising distribution ducts which are in fluid flow communication with the supply chambers.

In accordance with a further aspect of the present disclosure, an impingement oven for thermally processing food products being transported on a conveyor comprises:
a longitudinal impingement housing through which the conveyor passes;
supply chambers disposed on both longitudinal sides of the impingement housing;
a blower system for blowing thermal processing medium into the two supply chambers; and
distribution ducts extending from both supply chambers to direct thermal processing medium toward the conveyor. The distribution ducts include upper distribution ducts, positioned above the conveyor, and lower distribution ducts, positioned beneath the conveyor.

In accordance with a further aspect of the present disclosure, a method is provided for operating an impingement oven for thermal processing food products as the food products are being transported on a conveyor, the method comprising:
directing thermal processing fluid downwardly through supply chambers located on both sides of the conveyor;
directing the thermal processing fluid from the supply chambers to extend downwardly onto the conveyor; and
directing the thermal processing fluid from the supply chambers to extend upwardly toward the underside of the conveyor.

In accordance with a further aspect of the method of the present disclosure, the impingement oven includes upper and lower sections, and a water seal is created between the upper and lower sections of the impingement oven. The method also utilizes the water from the water seal to clean the interior of the impingement oven.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is an isometric view of the impingement oven of the present disclosure shown in closed position;

FIG. 5A is a side elevational view of the upper housing structure of the impingement oven with portions broken away so as to view the internal construction of the upper housing structure;

FIG. 5B is a cross-sectional view of FIG. 5A taken along lines 5B-5B thereof;

FIG. 5C is a view similar to FIG. 5A showing the upper housing structure weldment;

FIG. 5D is an end view of FIG. 5C;

FIG. 20 is a view similar to FIG. 16, but with the bottom distribution ducts replaced by a lower plenum chamber;

FIG. 21 is a view similar to FIG. 20, but with the nozzles of the plenum chamber staggered with respect to the nozzles of the upper distribution ducts;

FIG. 22 is a view similar to FIG. 18, but with the lower individual distribution ducts replaced by a singular plenum chamber;

FIG. 23 is a view similar to FIG. 22, but with the nozzles of the plenum chamber staggered in position relative to the nozzles of the singular upper distribution ducts;

FIG. 24 is a view similar to FIG. 1A showing the upper oven housing structure retracted upwardly;

FIG. 25 is a cross-sectional view of FIG. 24 taken along lines 25-25 of FIG. 4;

FIG. 26 is a view similar to FIG. 25, but with the upper oven housing structure retracted into operating position;

FIG. 27 is a cross-sectional view of FIG. 25 taken along lines 27-27 of FIG. 25;

FIG. 28 is a view similar to FIG. 27, but with the upper oven housing retracted upwardly;

FIG. 29 is an isometric view of a distribution duct cassette;

FIG. 30 is a pictorial view of a cross section of the impingement oven shown in FIG. 25;

FIG. 31 is a view similar to FIG. 30, but with the upper oven housing structure retracted upwardly.

DETAILED DESCRIPTION

Figure 1B:
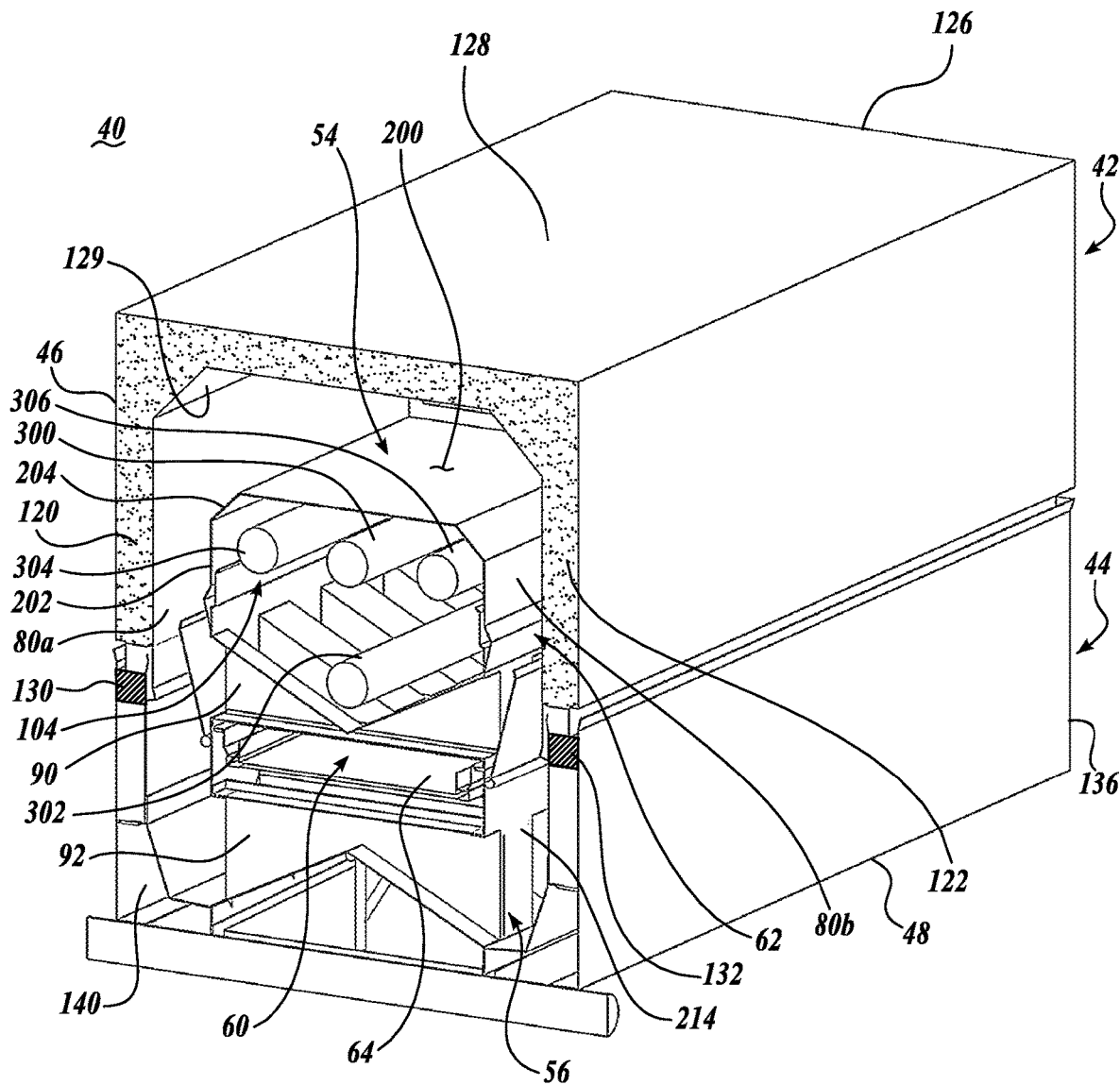
FIG. 1B is a diagrammatic, isometric cross-sectional view of an impingement oven of FIG. 1A, taken along lines 1B-1B thereof.

The attachments to this application, if any, as well as the detailed description set forth below in connection with the appended drawings, where like numerals reference like elements, are intended as a description of various embodiments of the disclosed subject matter and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "ahead," "behind," "upward," "downward," "above," "below," "vertical," "horizontal," "upright," "right-hand," "left-hand," "in," "out," "extended," "advanced," "retracted," "top," "bottom," "proximal," and "distal." These references and other similar references in the present application are only to assist in helping describe and understand the present disclosure and invention and are not necessarily intended to limit the present disclosure or invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha or other suffix. The descriptions of the parts/components of such systems assemblies, apparatus and units are the same or similar, and therefore are not repeated so as to avoid redundancy in the present application.

The present application refers to a "cooking medium," a "heated cooking medium," a "heated gaseous cooking medium," a "thermal processing fluid," and "heated air." These references are all directed to a gas or gas mixture used to thermally process food products utilizing the system, apparatus and process of the present disclosure. Unless the context of the present application indicates otherwise, these terms are synonymous with each other. Further, the cooking medium is composed primarily of a mixture of air and water vapor. The mass of water vapor Mv in the mixture can be from about 30% Mv to up to 100% Mv, Mv being the amount of water vapor constituency in the air and water vapor mixture of the cooking medium.

Figure 2A:
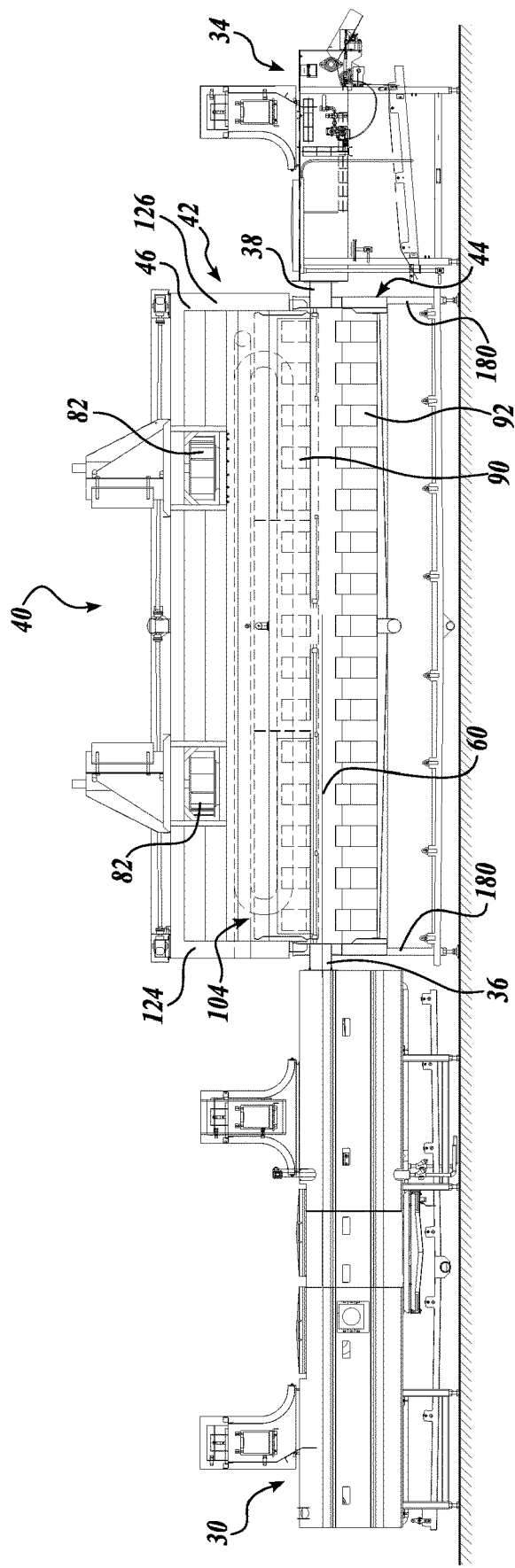
FIG. 2A is a longitudinal elevational view of a thermal processing system with steam chambers upstream from a thermal processing impingement oven.

Referring initially to FIG. 2A, an impingement apparatus in the form of oven 40 is shown located downstream from a steam chamber 30, as well as upstream from a discharge chamber 34. The impingement oven 40 is connected to steam chamber 30 by a connector 36 and to the discharge oven by a connector 38. As noted above, the operation of the impingement oven can affect the operation of the steam chamber 30 as well as the discharge chamber 34. Vice versa, the operation of the steam chamber 30 and/or the discharge chamber 34 can affect the operation of the impingement oven 40. In this regard, the cooking medium in the steam chamber 30 may mix with the cooking medium in the impingement oven 40. Also, the medium in the impingement oven 40 may mix with the medium in the discharge chamber 34. The impingement oven 40 of the present disclosure seeks to limit undesirable mixing of the cooking medium between the chambers 30 and 34 and the oven 40.

Referring to FIGS. 1A to 4, the impingement oven 40 is illustrated as including in basic form a hood assembly 42 and a base assembly 44. The hood assembly 42 includes an upper housing structure 46 forming the exterior of the upper half of the impingement oven 40 and in lateral cross-section generally in the shape of a downwardly open "U." Correspondingly, the base assembly 44 includes a lower housing structure 48 to mate with the upper housing structure 46, with the lower housing structure 48 generally in the form of a upwardly open U. The upper housing structure 46 includes frame structure 50 built into the housing structure, see FIGS. 5A and 5B, and likewise the lower housing structure 48 includes a lower frame structure 52 built into the lower housing structure, see FIG. 2B.

The impingement oven 40 also includes an interior impingement housing 62 composed of an upper impingement housing section 54 that is generally U-shaped and disposed interior to the inner wall of the upper housing structure 46. Correspondingly, a lower impingement housing section 56 is spaced inwardly of the interior walls of the lower housing structure 48 and corresponds to the upper impingement housing structure 54. The lower impingement housing section 56 is configured to be supported and carried by lower frame structure 52. A conveyor 60 extends through the impingement housing 62. The upper run 64 of the conveyor 60 extends into the impingement oven 40 through an opening 66 at the upstream end of the lower housing structure 48 and exits the oven through an outlet 68 at the other end of the lower housing structure 48. An appropriate seal arrangement, such as an air curtain, can be utilized to limit outflow of heated air and moisture through the inlet 66 and outlet 68.

As shown in FIGS. 1B to 4, the inside surfaces of the upper and lower housing structures 46 and 48 cooperate with the upper and lower impingement housing sections 54 and 56 to define upright chambers 80a and 80b on opposite sides of the impingement oven to direct cooking medium, for example, a heated medium that can be composed of air and moisture, from central overhead fans or blowers 82 downward upon products being carried by the conveyor belt upper run 64 and also to direct the hot cooking medium upwardly through the porous conveyor belt from beneath the upper run 64, as depicted by arrows 84 and 86. As explained more fully below, one or more upper distribution chambers in the form of distribution ducts 90 direct the heated cooking medium from both the supply chambers 80a and 80b to impinge downwardly toward the conveyor upper run 64 just above the conveyor surface.

Correspondingly, one or more lower distribution chambers, in the form of distribution ducts 92, direct the heated medium from both the supply chambers 80a and 80b to the underside of the conveyor upper run 64 just beneath the lower surface of the conveyor run. As discussed more fully below, the upper distribution ducts 90 and lower distribution ducts 92 can be of various constructions and shapes.

A heating system 100 is provided to heat the air within the impingement housing 62 below the intake for the fans 82 and above the upper distribution ducts 90. The heating system 100 can be of various configurations, including a burner 102 mounted exterior to the oven 40 and a serpentine-shaped tubular heat exchanger 104 extending back and forth longitudinally within the interior impingement housing 62, as described more fully below.

Also, steam or moisture may be introduced into the supply chambers 80a and 80b or the interior impingement housing 62 so as to achieve a desired moisture content of the cooking medium.

Describing the above features of the impingement oven 40 in greater detail, referring to FIGS. 1B, 2B, 3 and 4, the upper housing structure 46 includes side walls 120 and 122, end walls 124 and 126, and a top wall 128. In the interior of the upper housing structure 46, the juncture between the inside surfaces of the side walls 120 and 122 with the top wall 128 intersect at beveled or diagonal upper corners 129. The exterior of the upper housing structure is generally rectangular in shape. The upper housing structure 46 may be constructed with an interior and exterior metallic skin or wall separated by thermal insulating material between the inner and outer surfaces.

The lower housing structure 48 is of construction similar to that of the upper housing structure 46, including having lower housing structure side walls 130 and 132 positioned beneath upper housing structure side walls 120 and 122. The lower housing structure 48 also includes end walls 134 and 136, as well as a bottom wall 138. As in the construction of the upper housing structure, at the intersection of the bottom wall with the side walls as well as with the end walls, the corners, such as intersections 140, are beveled or diagonal so as to define a thicker cross-sectional area of the lower housing structure at such corners. Also, as in the upper housing structure 46, the lower housing structure 48 may be composed of metallic or other durable exterior and interior surfaces that are separated by a thermal insulating material, or may be filled with water to form a water seal with the upper housing structure 46, as described below, thereby to achieve a significant wall thickness of, for example, from four to six inches.

Figure 4:
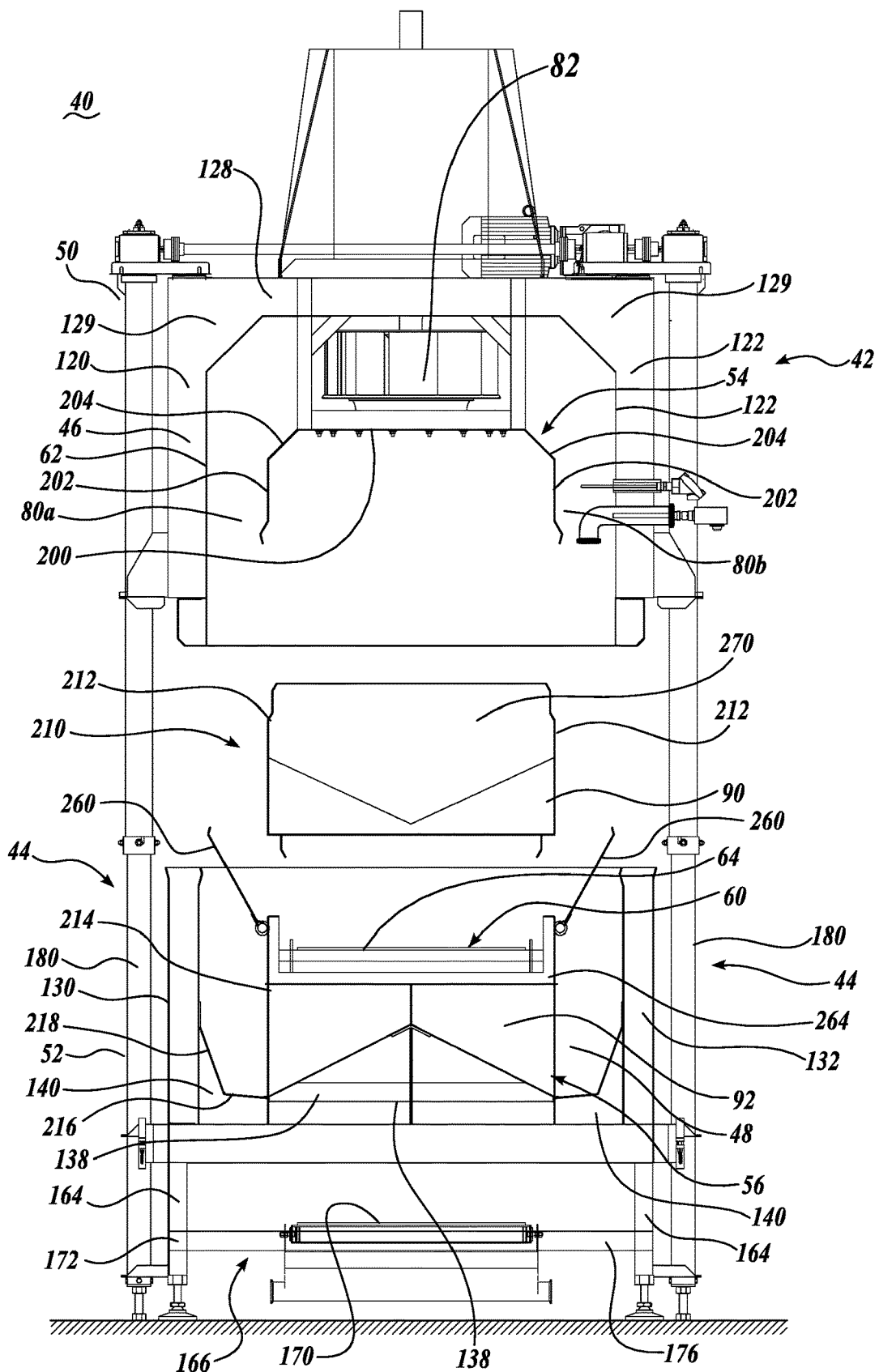
FIG. 4 is a view similar to FIG. 3, but with the upper oven housing structure retracted upwardly.

As specifically illustrated in FIG. 4, the hood assembly 42 may be raised and lowered relative to the base assembly 44, for example, when inspecting, repairing, or otherwise requiring access to the interior of the impingement oven 40. To this end, the hood assembly 42 includes an upper frame structure 50 integrated into the structure of the upper housing structure 46. Referring additionally to FIGS. 5A to 5D, the frame structure 50 includes longitudinal frame members 150 defining the longitudinal upper and lower corners of the frame structure 50 as well as vertical corner members 152 at each end of the frame. Also, top and bottom transverse members 154 extend across each end of the frame. Further, intermediate the ends of the frame structure, additional vertical members 156 span between the longitudinal frame members 150 along each side of the frame. Correspondingly, additional top and bottom transverse members 154 span across the top of the frame as well as across the bottom of the frame. Reinforcing members may also be utilized, for example, diagonal members 160 shown in FIGS. 5A and 5C, extending from the lower central portion of each side of the frame to the upper corner at each end of the frame. Of course, other frame members and reinforcing members may be utilized. The upper housing structure 46 may be encased by and attached to the upper frame structure 50.

Figure 2B:
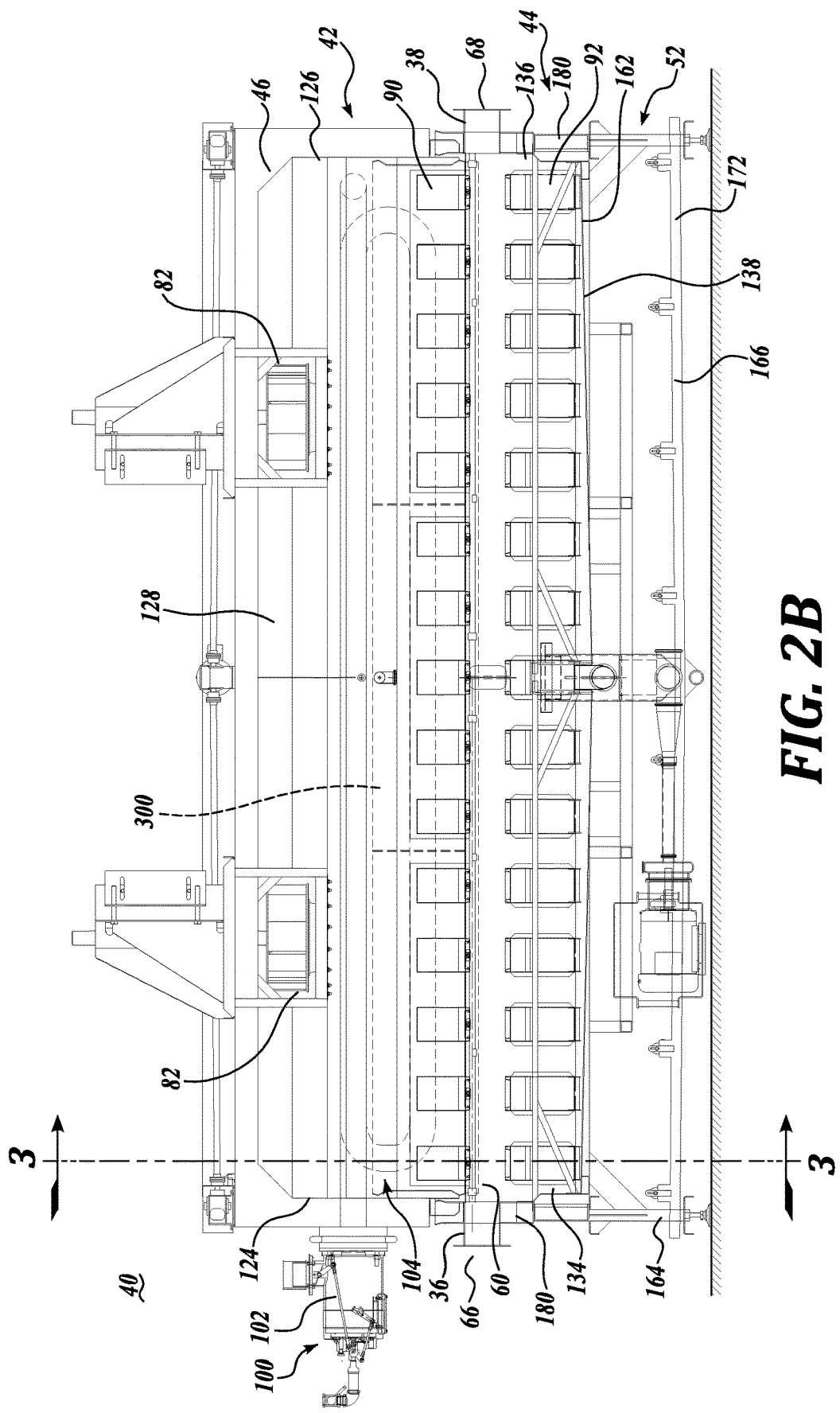
FIG. 2B is a longitudinal elevation view of the impingement oven of FIGS. 1A and 2A, with portions removed so as to enable viewing of certain internal aspects of the impingement oven.
Figure 3:
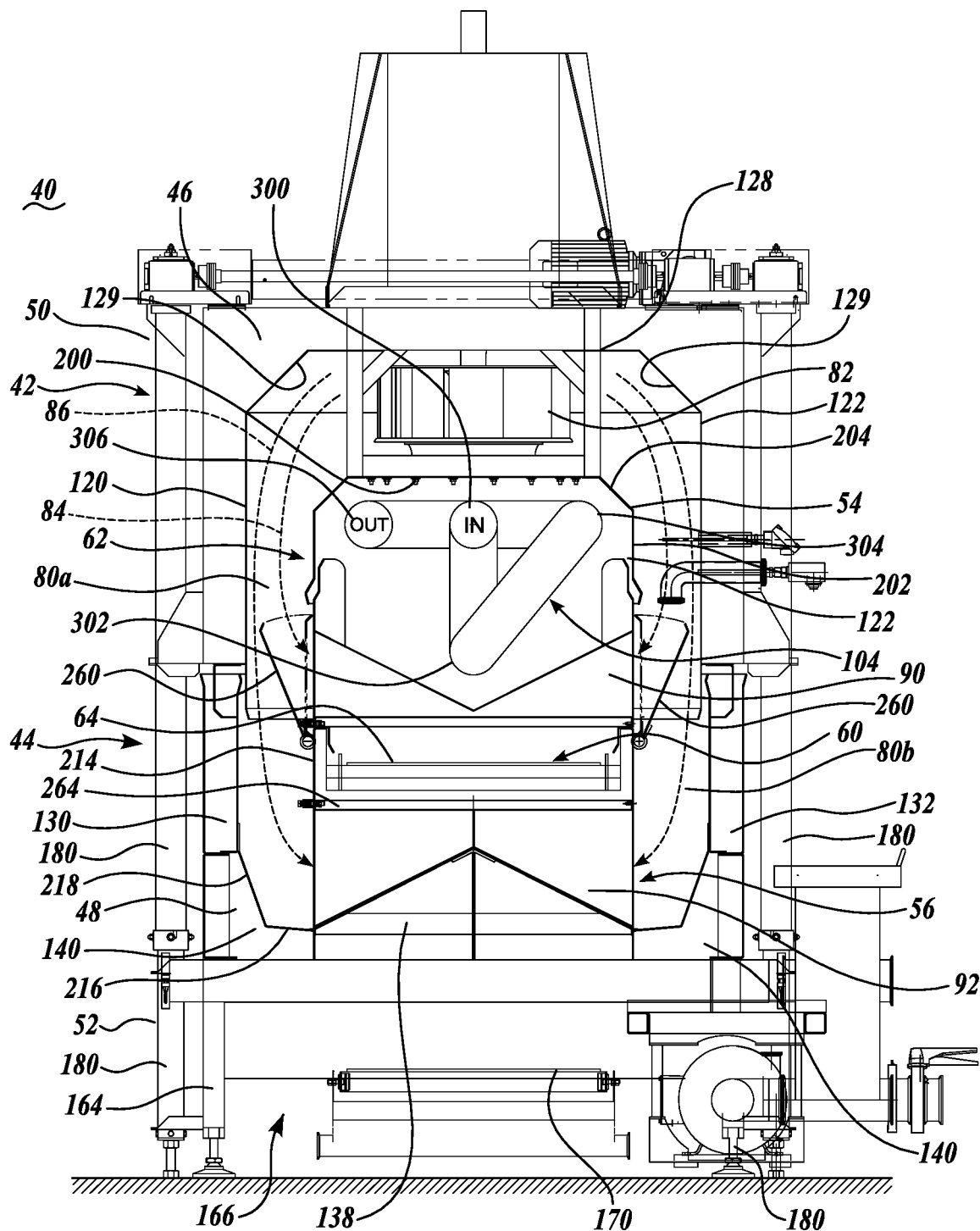
FIG. 3 is a cross-sectional view of FIG. 2B taken along lines 3-3 thereof.

The lower housing structure 48 is carried by lower exterior frame structure 52. Referring to FIGS. 2B, 3, and 4, the lower frame structure 52 is configured to support the lower housing structure 48. The lower frame structure 52 is supported off the floor surface by legs 164. The lower frame structure 52 also includes a downwardly depending substructure 166 to support the bottom run 170 of the conveyor 60. The substructure 166 includes longitudinal frame members 172 that span between legs 164. A series of cross members 176 extend laterally to tie together the two longitudinal members 172 at the bottom of each hanger member 74.

Upper housing structure 46 is raised and lowered relative to the lower housing structure 48 by telescoping legs 180 extending downwardly from the corners of the upper housing structure as shown in FIGS. 1A and 2A-4. The legs 180 can be extended and retracted by numerous means, including hydraulically, pneumatically, or mechanically, for example, utilizing a rotating lead screw disposed within the interior of the legs 180.

Figure 6:
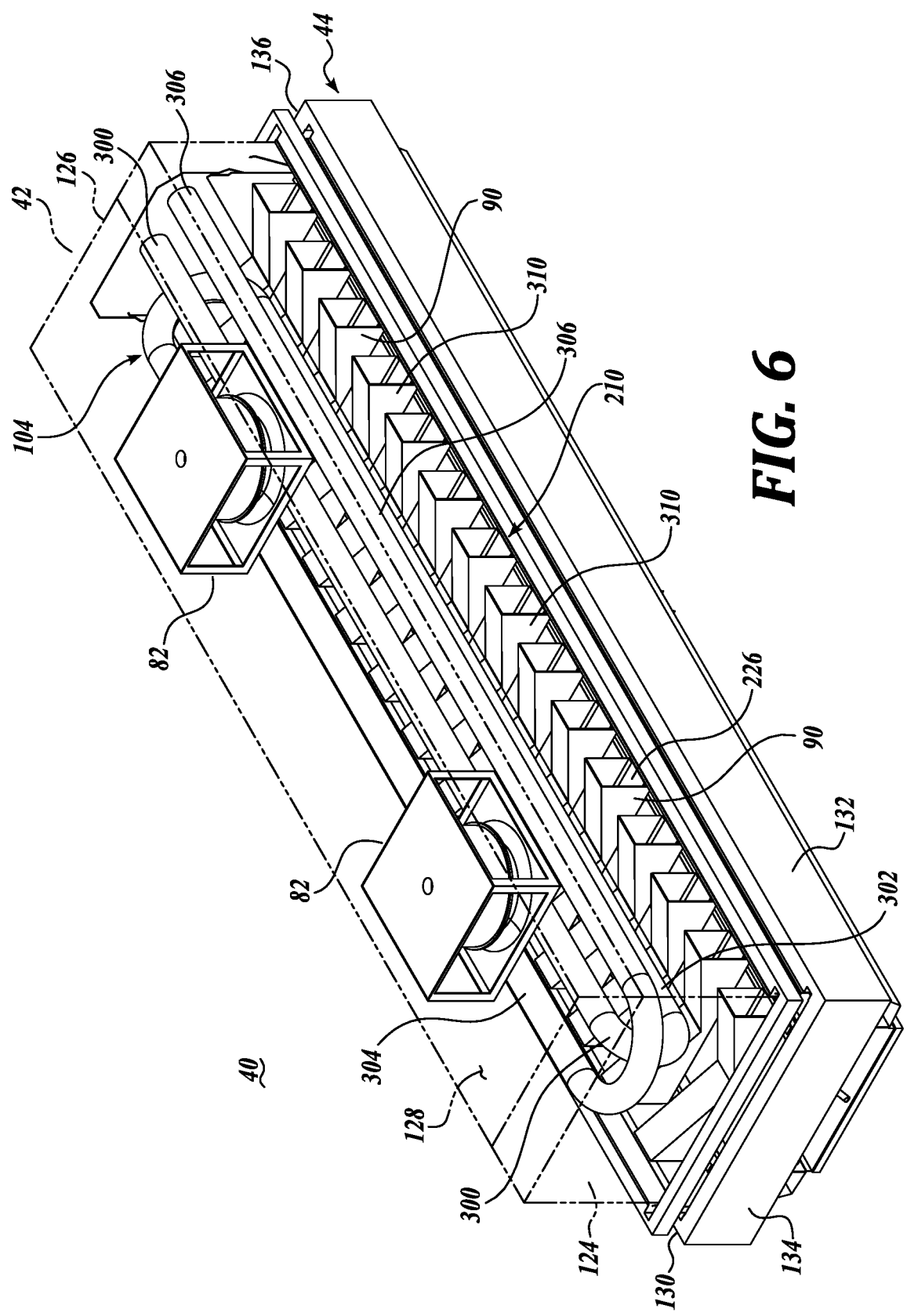
FIG. 6 is an isometric view of a portion of the interior of the impingement oven with portions removed so as to view the top distribution duct cassette structure.
Figure 7:
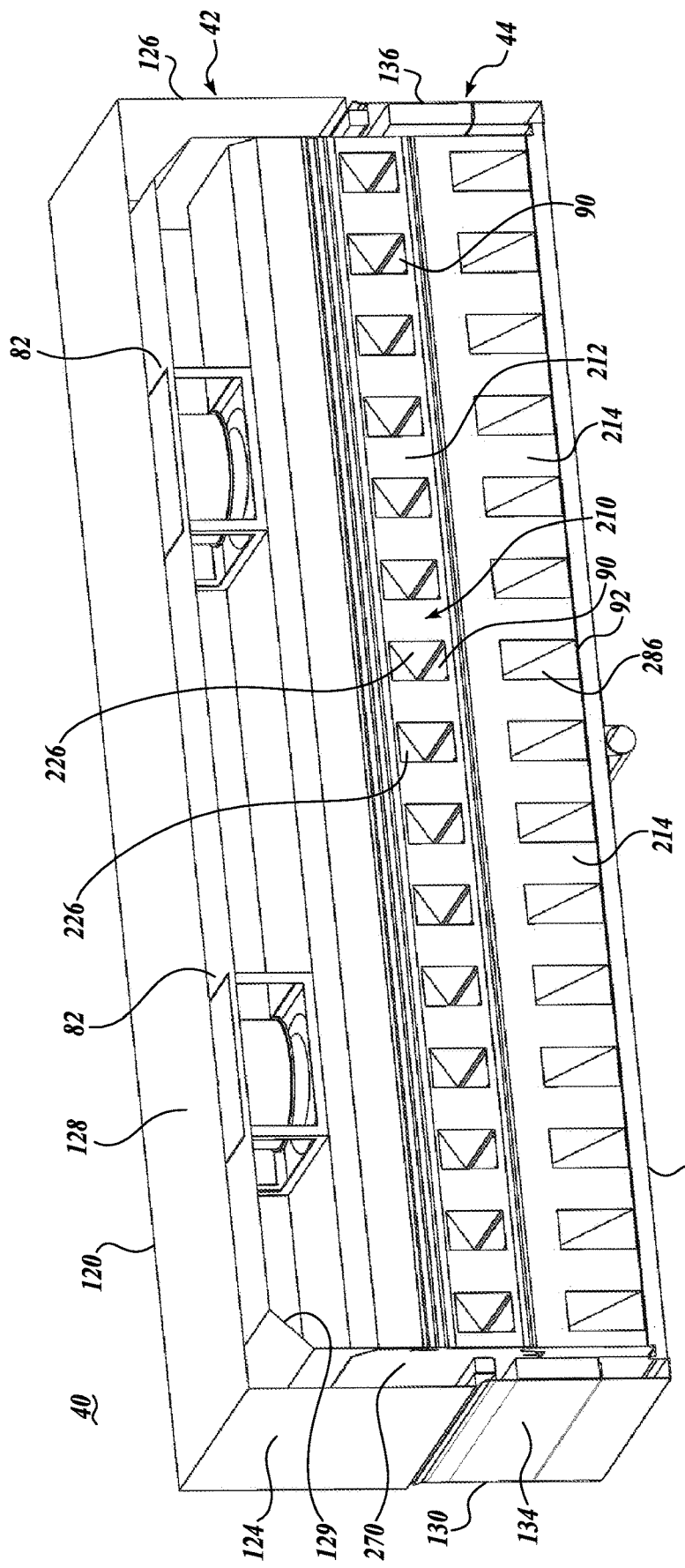
FIG. 7 is a structure similar to FIG. 6 but with additional aspects of the top distribution duct cassette structure and the lower impingement housing section illustrated.

Next, referring to FIGS. 1B, 3 and 4, in cross-section the upper impingement housing section 54 is shaped generally in the form of a downwardly open U having the top horizontal wall 200 and downwardly depending side walls 202 intersecting the top wall at diagonal corners 204. The lower portions of the side walls 202 mate with the upper exterior side portions 212 of a top distribution cassette structure 210. As illustrated in FIGS. 4, 6, and 7, the cassette structure 210 defines a distribution chamber in the form of a plurality of top or upper hollow distribution ducts 90 spaced apart along the cassette structure. The cassette structure includes solid side walls 212 except at the location of the upper distribution ducts 90 where the side walls 212 are open at the interface with the adjacent ends of the distribution ducts. As such, the side walls 212 in conjunction with the impingement housing side walls 202 form the interior surfaces of the upper supply chambers 80a and 80b.

The interior of the lower sections of the supply chambers 80a and 80b are also defined by side walls 214 of the lower impingement housing 56. Such side walls are solid except at the location of the lower distribution ducts 92 comprising a lower distribution chamber, as described more fully below. The side walls 214 are supported by the lower frame structure 52. The bottoms of the supply chambers 80*a* and 80*b* are also defined by a bottom wall 216 and a diagonal corner wall 218 extending between side wall 214 and bottom wall 216, thereby to direct the heated cooking medium in the supply chambers into the lower distribution ducts 92, see in particular FIGS. 3 and 4.

Figure 8:
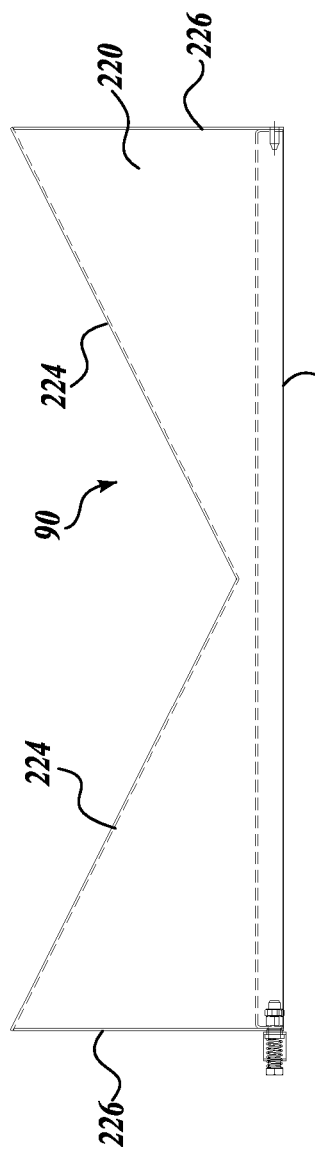
FIG. 8 is an enlarged fragmentary elevational view of an upper distribution duct.
Figure 9:
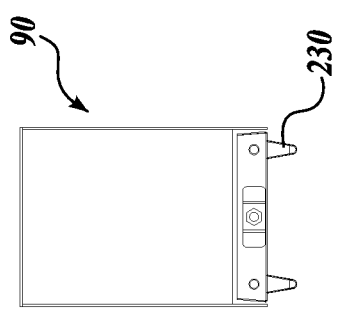
FIG. 9 is an end view of FIG. 8.

Referring additionally to FIG. 8, the upper distribution ducts 90 are generally in the shape of a double triangle that tapers to a tip portion at the lateral center of the duct, with the open bases of the triangles in fluid flow communication with the supply chambers 80*a* and 80*b*. Thus, each triangular section of the distribution ducts 90 extends half-way across the impingement housing from each supply chamber 80*a* and 80*b*. Each of the upper distribution ducts 90 is thus formed from double triangularly-shaped side wall panels 220, a bottom wall panel 222 spanning across the bottom upper duct 90, sloped top walls 224 closing off the top of the distribution ducts. As noted above, the laterally outward ends 226 of the distribution ducts are open so as to be in communication with supply chambers 80*a* and 80*b*. As shown in FIG. 9, two downwardly directed, longitudinal outlet air slots or nozzles 230 are formed along the opposite sides of the distribution ducts so as to direct two sheets of cooking medium downwardly from the upper distribution ducts 90 toward the upper run 64 of the conveyor 60. Otherwise, the bottom of the upper distribution duct 90 is closed off by the bottom wall 222.

It will be appreciated that by the foregoing construction of the upper distribution ducts 90, cooking medium is directed downwardly toward the top of the conveyor belt upper run 64 in a uniform manner. The double triangular shape of the upper distribution ducts is calculated to cause the cooking medium to be directed substantially uniformly across the width of the conveyor upper run at a velocity of up to about 7,000 feet/minute. Also, since cooking medium enters the hollow upper duct 90 from both ends thereof from corresponding supply chambers 80*a* and 80*b*, the cooking medium is distributed substantially evenly across the entire width of the belt upper run 64.

Continuing to refer primarily to FIGS. 1B to 4, 10, and 11, the lower distribution ducts 92 may be constructed similarly to the upper distribution ducts 90, and thus the lower distribution ducts direct a substantially uniform sheet of cooking medium at a significant mass flow rate upwardly toward the underside of the conveyor upper run 64. In this regard, the lower distribution ducts 92, when viewed along the length of the conveyor 60, are in the shape of a double triangle, disposed tip-to-tip at the center of the conveyor. The base portions 286 of the two triangular shapes are disposed at the ends of the lower distribution ducts and are open so as to be in fluid flow communication with the supply chambers 80*a* and 80*b*. As such, each of the lower distribution ducts 92 includes spaced-apart side walls 240 generally in a triangular form with the tips of the triangles meeting at the center of the distribution ducts. A top wall 242 spans the spaced-apart side walls 240 to substantially close off the upper surface of the lower duct 92. Sloped bottom walls 244 close off the hypotenuse portions of the double triangular sections of the lower duct 92. As in the upper ducts, two air nozzles or slots 246 extend along the sides of the top of the ducts 92 so as to direct two sheets of cooking medium upwardly from the lower duct 92. The construction of the lower duct 92 results in the upwardly-directed sheets of cooking medium being substantially uniform across the entire width of the conveyor.

Figure 10:
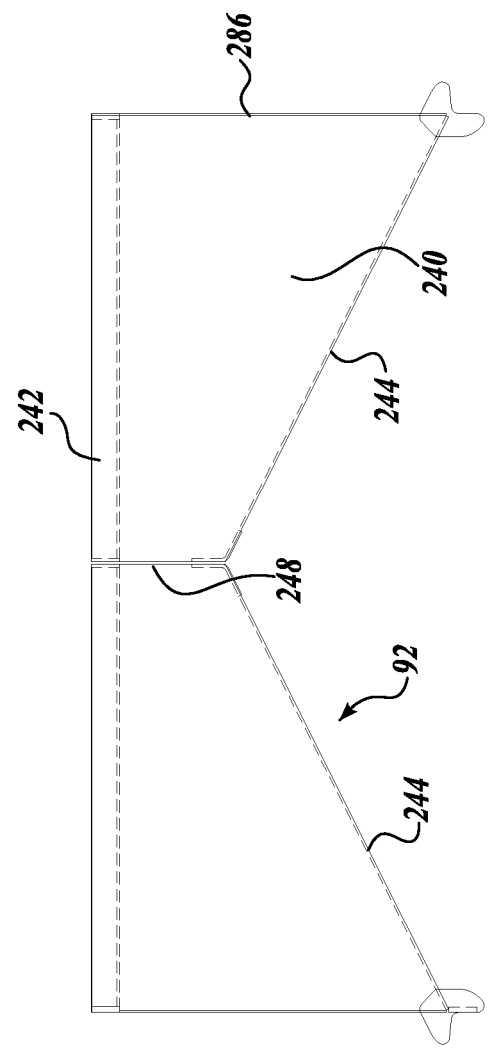
FIG. 10 is an elevational view of a lower distribution duct.
Figure 11:
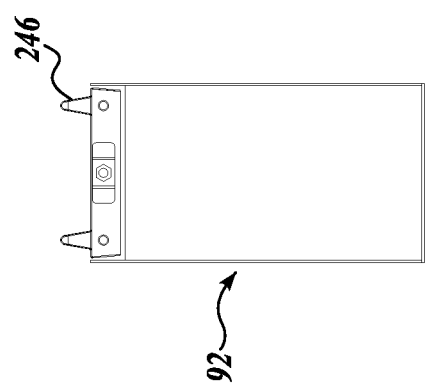
FIG. 11 is an end view of FIG. 10.

As shown in FIG. 10, at the center of the lower distribution ducts 92, an optional partition wall 248 may extend upwardly to close off the truncated portions of the lower duct or alternatively the two sections of the duct 92 may be in open communication with each other. Without the dividing wall 248, the air flow in the duct 92 may assist in balancing the cooking medium entering the lower duct from each end thereof in the situation in which one supply chamber 80*a* or 80*b* may be at a higher pressure than the other supply chamber 80*b* or 80*a*.

The lower distribution ducts 92 can be constructed as individual units that are insertable into the base assembly of the impingement oven at a location between the side walls 214 of the lower impingement housing section 56. Access to the lower distribution ducts 92 can be obtained by, for example, pivoting the upper run of the conveyor 64 on one side thereof or lifting the conveyor upper run upwardly away from the lower distribution ducts 92. As an alternative, the lower distribution ducts 92 can be constructed as a cassette structure, for example, similar to cassette 210 described above. Such cassette structure could be supported by the impingement housing 62 and/or the lower housing structure 48.

Pressurized cooking medium is applied to the supply chambers 80*a* and 80*b* by overhead blowers 82 mounted centrally and at the top of the supply chambers 80*a* and 80*b*. The blowers 82 may be powered by an external power source, such as an electric motor. The blowers 82 draw in spent cooking medium from the top of the upper impingement housing 54, and then direct pressurized cooking medium downwardly through the supply chambers 80*a* and 80*b* extending along opposite sides of the impingement housing 62.

Referring specifically to FIGS. 3 and 4, a valve or damper 260 is mounted to the side walls 214 of the lower impingement housing section 56. Dampers 260 are pivoted mounted on the upper portion of the side walls 214 to extend upwardly therefrom. The dampers can be rotated about their pivot axis, thereby to control the proportion of air that enters the upper distribution ducts 90 relative to the proportion of cooking medium that enters the lower distribution ducts 92. As can be appreciated, the damper 260 can be controlled to enable any proportion of the cooking medium to be divided between the upper and lower distribution ducts 90 and 92. The dampers 260 can be controlled by any convenient means, such as with a hand crank, stepper motor, rotational actuator, linear actuator, etc.

Rather than mounting the valve or damper 260 to the side walls of the lower impingement housing section 56, the dampers can be mounted at other locations on the impingement housing 62 or mounted on the upper or lower housing structure. Also, rather than the dampers being in the form of a plate type structure, the dampers can be of other constructions, including, for example, louvres with adjustable openings, pivotable fins or slats, etc. Regardless of construction, the purpose of such dampers or valves is to regulate the proportion of heated cooking medium directed to the top side of the conveyor 60 relative to the bottom side of the conveyor.

Referring specifically to FIGS. 4, 6, and 7, the top distribution cassette structure 210 is constructed as a unitary structure that includes the upper distribution ducts 90, as well as forming the impingement housing 62 section located between the upper impingement housing section 54 and the lower impingement housing section 56. In this regard, the cassette structure 210 includes side walls 212 that extend between upper impingement structure side walls 202 and the lower impingement structure side walls 214. Openings are formed in the side walls to match the adjacent open ends 226 of the distribution ducts 90. The ends of the distribution ducts can be sealed relative to the side walls to avoid leakage of the cooking medium at this juncture of the distribution ducts in the side walls. The cassette structure 210 is constructed to sit on the upper edges of a U-shaped support structure 264, which is built in to the lower impingement housing section 56, which in turn is carried/supported by lower frame structure 52. Such support structure 264 also carries the rollers positioned beneath the upper run 64 of the conveyor 60.

The cassette 210 also includes transverse end walls 270 extending across the ends of the cassette and joined to the cassette side walls 212. Additional partition/stiffen walls similar in shape to the end walls can be positioned along the length of the cassette 210 to provide stiffness and structural integrity to the cassette. This allows the cassette 210 to be manufactured as a stand-alone structure and inserted between the upper and lower impingement housing sections 54 and 56. As discussed below, the configuration of the distribution ducts 90 can be changed by utilizing cassettes of different configurations. Also, rather than constructing the cassette 210 as a single structure extending substantially the full length of the upper impingement housing section, several cassettes each comprising a plurality of distribution ducts 90, can be utilized. In this manner, the cassettes may be more easily lifted and/or removed for service or cleaning of the oven 40.

Next, referring to FIGS. 2A, 2B, 3, 5A and 6, the cooking air or medium within the impingement oven 40 is heated by a heating system 100. Such heating system may include a burner 102 mounted exterior to and at one end of the hood assembly 42, see FIG. 2B. The burner includes a blower section that is connected to one end of the upper central run 300 of a tubular heat exchanger 104. The central run 300 extends centrally through the upper portion of the impingement chamber just beneath the top wall 200 of the upper impingement housing section 54. The central run 300 extends the full length of the upper impingement housing section 54, and then connects to the distal end of a lower central run 302 of the tubular heat exchanger 104, thereby to return to the end portion of the upper impingement housing section where the burner 102 is located. The proximal end of the lower run 302 connects to the proximal end of the upper side run 304 of the tubular heat exchanger by an elbow section. The upper side run 304 extends to the distal end of the upper impingement housing section 54. The distal end of the upper side run 304 connects to an opposite upper side run 306, which then extends from the distal end of the upper impingement housing section 54 to terminate at a location adjacent the end of the upper impingement housing section 54, at which the burner 102 is located.

The tubular heat exchanger 104 can be of various compositions, for example, metallic pipe from three to six inches in diameter. As one non-limiting example, the metallic pipe can be four inches in diameter. Also, although not shown, fins, or other surfaces can project from the exterior of the pipe forming heat exchanger 104 to enhance heat transfer from the pipe to the ambient.

It will be appreciated that other types of heating systems can be used in place of burner 102. As non-limiting examples, an electrical heating system may be employed or a direct gas heating system may be utilized. Moreover, the heating system can be located elsewhere than within the impingement housing 62. For example, heaters or the heating system can be located in the supply chambers 80a and 80b. Alternatively, the heating system can be located exterior of the impingement oven 40. As a further alternative, the heating system can be positioned at the bottom of the impingement housing 62 rather than at the top as described above.

As a further alternative, a low nitrous oxide heating system may be utilized. Such system would employ a specific type of burner that impinges on itself internally to create a reduction reaction. Such burners are commercially available, for example, the OVENPAK®LE Burner sold by Maxon Corporation. If a low nitrous oxide burner is utilized, the heat exchanger employed would be different in shape from the tubular heat exchanger 104 described above. Rather, the heat exchanger would have a relatively large duct for the first pass in place of central run 300 described above, with only one or two return passes. This heat exchanger may also include secondary heating tube passes in smaller size through which the secondary exhaust gases from the burner are circulated prior to exiting the duct.

Next, describing the flow path of the heated cooking medium or air, the heated cooking medium enters the input of the blowers 82 through holes or openings formed in the top wall 200 of the upper impingement housing section 54. The blowers 82 are located centrally at the top of the hood assembly 42, beneath the upper housing structure 46 and above the upper impingement housing section 54, and thus at the upper locations where the supply chambers 80a and 80b originate. The blowers direct the heated cooking medium laterally outwardly, causing the medium to flow downwardly through both the supply chambers 80a and 80b, at each side of the impingement oven, in substantially balanced fashion, see arrows 84 and 86. As can be appreciated, the area around the blowers 82 is unobstructed so that the cooking medium from this blower is free to enter the upper sections of the supply chambers 80a and 80b.

Part of the heated cooking medium flowing downwardly through the supply chambers 80a and 80b is directed to the open ends of the upper distribution ducts 90, see arrows 84. Such cooking medium in the ducts 90 then flows downwardly through nozzles or slits 230 formed in the distribution ducts 90, extending laterally across the upper impingement housing section. Such medium impinges downwardly onto the upper run 64 of the conveyor 60, thereby to cook or otherwise heat-treat the food products or other products being carried by the conveyor. As shown in the drawings, the supply chambers 80a and 80b are unobstructed so as not to present any appreciable hindrance to the flow of the cooking medium down the chambers and into the distribution ducts 90 and 92.

After impinging against the food product or other product to be heat-treated, the cooking medium travels upwardly between adjacent upper distribution ducts since the cassette structure 210 is open in the areas 310 between the upper distribution ducts 90, see FIG. 6. This permits the spent cooking medium to rise upwardly in the upper impingement housing section 54, past the tubular heat exchanger 104, whereby the return air is heated prior to entering the inlet of blower 82.

With respect to the flow path of the cooking medium discharged by the lower distribution ducts 92, such medium first flows down the supply chambers 80a and 80b, past dampers 260, and into the open ends of the lower distribution ducts 92, see arrows 86. Such cooking medium is discharged through the nozzles 246 of the lower distribution ducts 92 in the form of upwardly directed, thin fluid streams or fluid curtains toward the underside of the upper run 64 of the conveyor belt 60. After impinging against the food product or other product being carried by the conveyor belt, the cooking medium from the lower distribution ducts 92 may pass through the belt through openings therein, and into the space beneath the upper distribution ducts 90 and then upwardly through the spaces 310 between the upper distribution ducts, to travel along the same route as the spent cooking gas from the upper distribution ducts. Also, the spent cooking medium from the lower distribution ducts 92 may pass laterally beyond the sides of the conveyor belt upper run 64, and then travel upwardly through the cassette structure between the locations of the upper distribution ducts 90, and then continue upwardly to the top of the upper impingement housing section 54. As will be appreciated, the foregoing structure provides for an efficient return of the spent cooking medium from the lower distribution ducts 92 to the blower intake 82. Further, the foregoing structure results in very little pressure loss in the cooking medium during circulation through the impingement oven 40.

Figure 12:
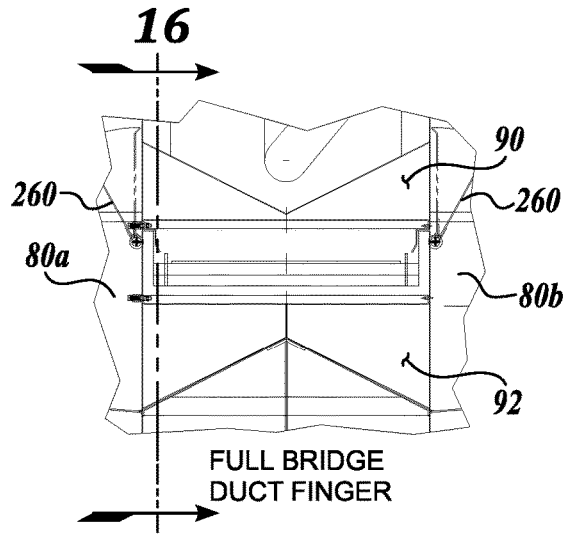
FIG. 12 is a fragmentary cross-sectional view of the impingement housing showing a particular construction for the upper and lower distribution ducts.
Figure 13:
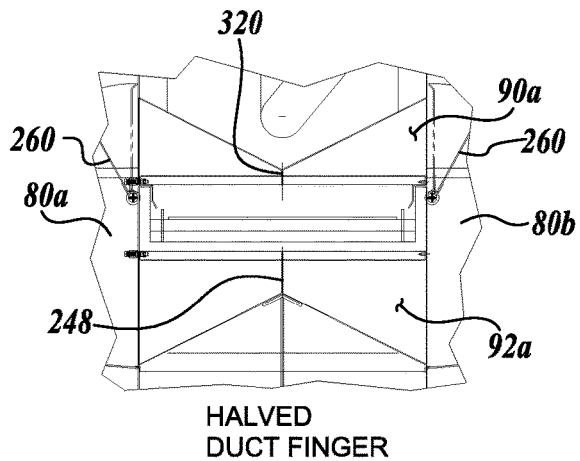
FIG. 13 is a view similar to FIG. 12 showing a different construction for the upper and lower distribution ducts.

Although one particular configuration of the upper and lower distribution ducts 90 and 92 has been described above, it will be appreciated that the distribution ducts can be of other configurations. The distribution ducts 90 and 92 as described above are shown in FIG. 12. FIG. 13 illustrates similar upper and lower distribution ducts 90a and 92a, but with optional partition walls 320 and 248 positioned centrally with respect to the distribution ducts so as to divide the distribution ducts into separate chambers, each fed from one of the supply chambers 80a or 80b.

Figure 14:
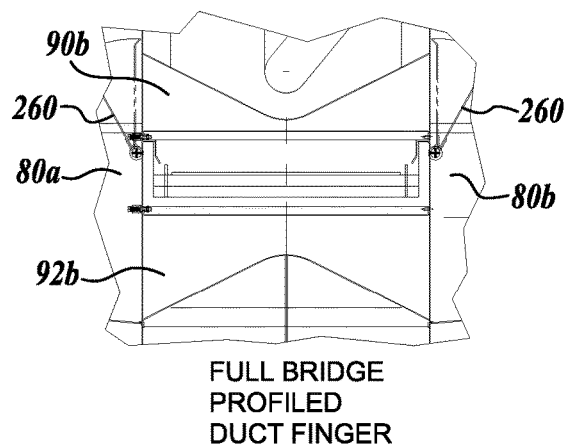
FIG. 14 is a view similar to FIG. 12, but with an alternative construction for the upper and lower distribution ducts.

The distribution ducts can be of various profiles, for example as shown in FIG. 14. In FIG. 14, the two chambers of the upper and lower distribution ducts 90b and 92b are joined at a curved intersection rather than at a sharp juncture, as shown in FIG. 12. Of course, the side profiles of the distribution ducts 90b and 92b can be of other shapes.

Figure 15:
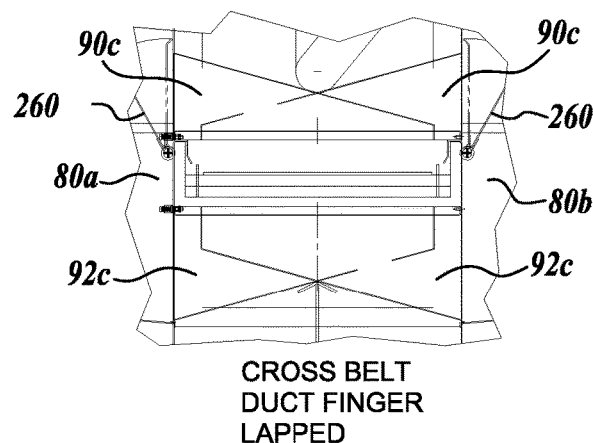
FIG. 15 is a view similar to FIG. 12 with a different construction for the upper and lower distribution ducts.

FIG. 15 illustrates distribution ducts 90c and 92c of overlapping construction. As shown in FIG. 15, each of the upper distribution ducts 90c extends across the entire width of the conveyor upper run 64. The upper distribution ducts 90c alternate as to be in fluid flow communication with either supply chamber 80a or 80b along the length of the cassette structure 210. The lower distribution ducts 92c can be of similar configuration to the upper distribution ducts 90c. As such, the lower distribution ducts 92c alternate along the length of the impingement oven from receiving the cooking gas from supply chamber 80a or supply chamber 80b.

Figure 18:
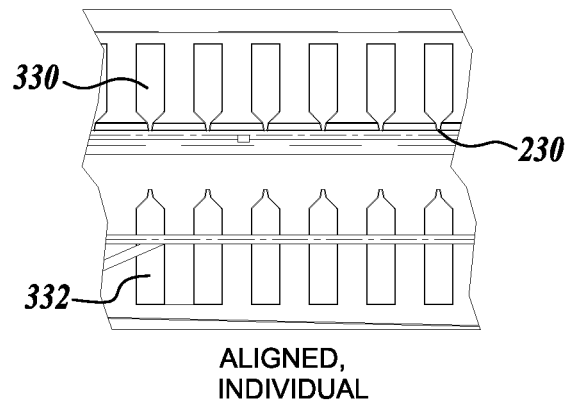
FIG. 18 is a fragmentary side elevational view similar to FIG. 16, but with upper and lower distribution ducts of a different constructions.
Figure 19:
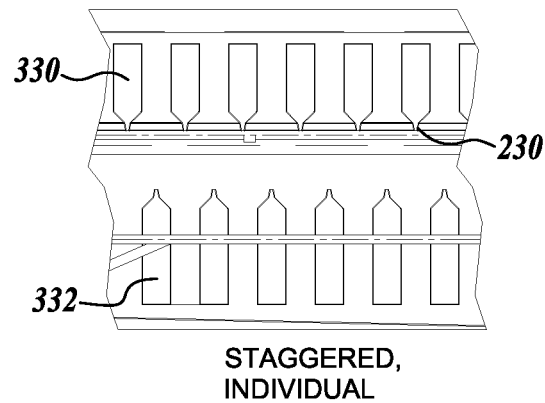
FIG. 19 is a view similar to FIG. 18 with the upper and lower distribution ducts shown in staggered position relative to each other.

The upper and lower distribution ducts 90 and 92 have been described above as of "tandem" construction, whereby each distribution duct is configured to direct two curtains of cooking air or fluid toward the upper run 64 of the conveyor. The upper and lower distribution ducts 90 and 92 can be of other constructions, whereby more than two cooking medium curtains are directed from each distribution duct toward the conveyor upper run. As a further alternative, as shown in FIGS. 18 and 19, the upper distribution ducts can be constructed in the form of individual upper and lower distribution ducts 330 and 332, whereby such distribution ducts direct a single curtain of cooking air or fluid toward the conveyor upper run 64.

Figure 16:
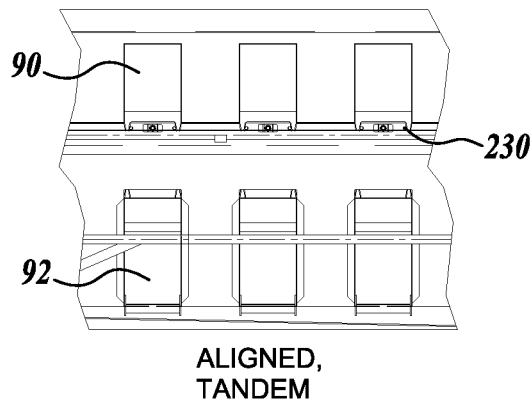
FIG. 16 is a fragmentary view taken substantially along lines 16-16 of FIG. 12 showing the alignment of the upper and lower distribution ducts.
Figure 17:
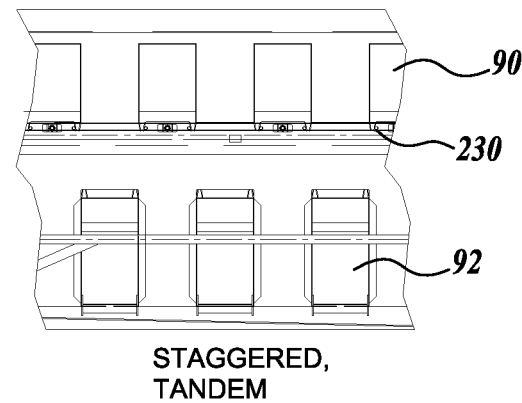
FIG. 17 is a view similar to FIG. 16 showing the different alignment of the upper and lower distribution ducts.

As a further alternative, the distribution ducts can be positioned variously relative to the length of the conveyor. As shown in FIG. 16, the distribution ducts 90 and 92 are aligned with each other in the vertical direction. However, as shown in FIG. 17, the distribution ducts 90 and 92 are staggered so that the distribution duct 90 is positioned between adjacent distribution ducts 92 and vice versa. Similarly, individual upper ducts 330 and lower ducts 332 can be aligned with each other along the length of the conveyor, as shown in FIG. 18, or the individual ducts 330 and 332 can be staggered relative to each other along the length of the conveyor, as shown in FIG. 19.

As a further alternative, different configurations of the distribution ducts 90 and 92 can be utilized in an impingement oven 40. For example, the impingement oven may utilize both distribution ducts 90 and 92, as well as distribution ducts 330 and 332 at the same time, depending on perhaps the level of impingement air desired relative to the longitudinal position of the food items or other products being processed along the length of the impingement oven 40.

FIGS. 20 to 31 depict a further embodiment of an impingement oven 40' of the present disclosure. The components of the impingement oven 40' are the same or very similar to the components of the impingement oven 40 shown in FIGS. 1A to 23 are identified with the same part number in FIGS. 24 to 31. The components of the impingement oven 40' that correspond to the components of oven 40' are identified with the same part number but with a prime "'" designation. Further, to avoid redundancy, these components and parts are not redescribed with respect to FIGS. 20 to 31.

Figure 26:
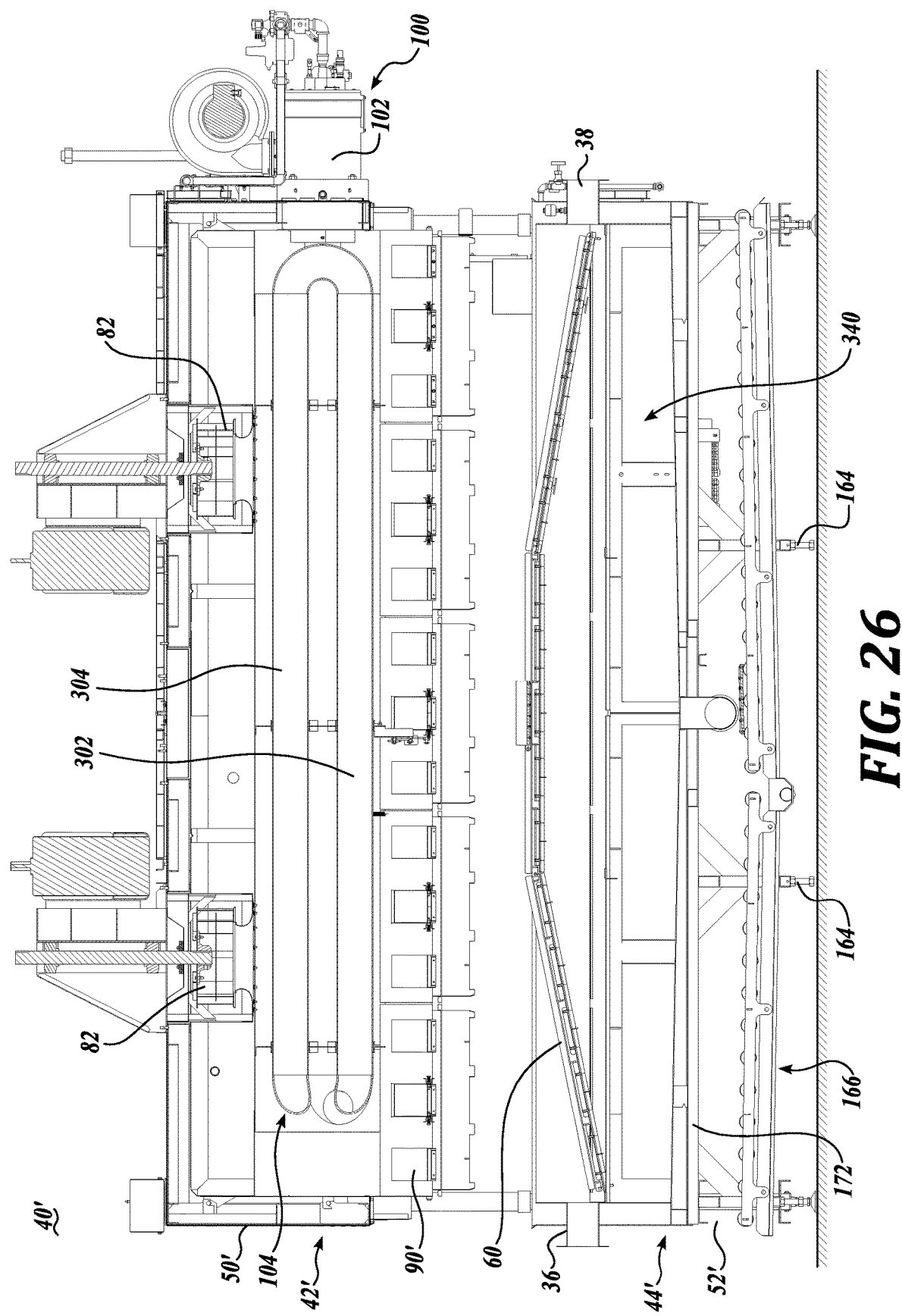
Figure 27:
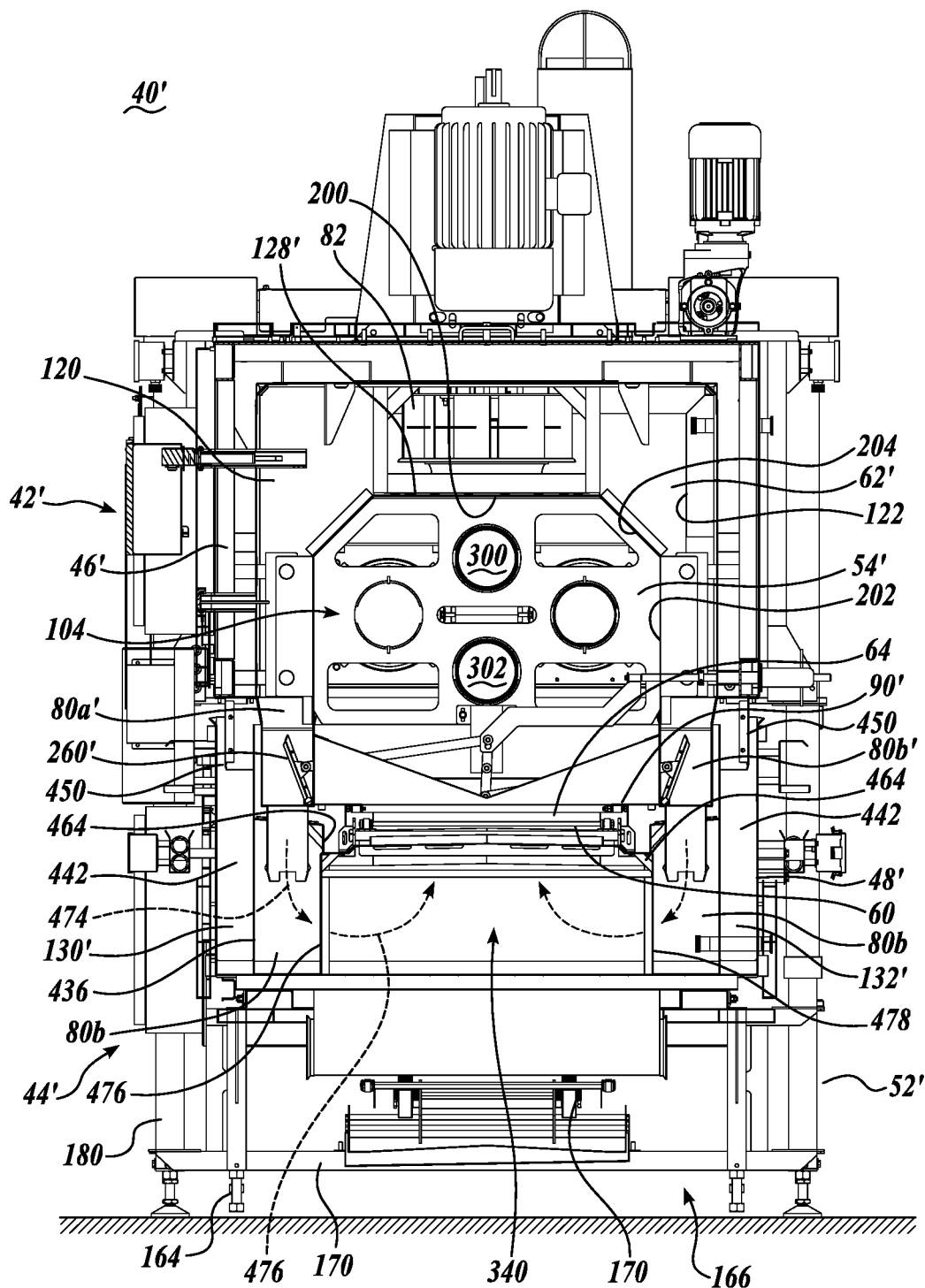
Figure 28:
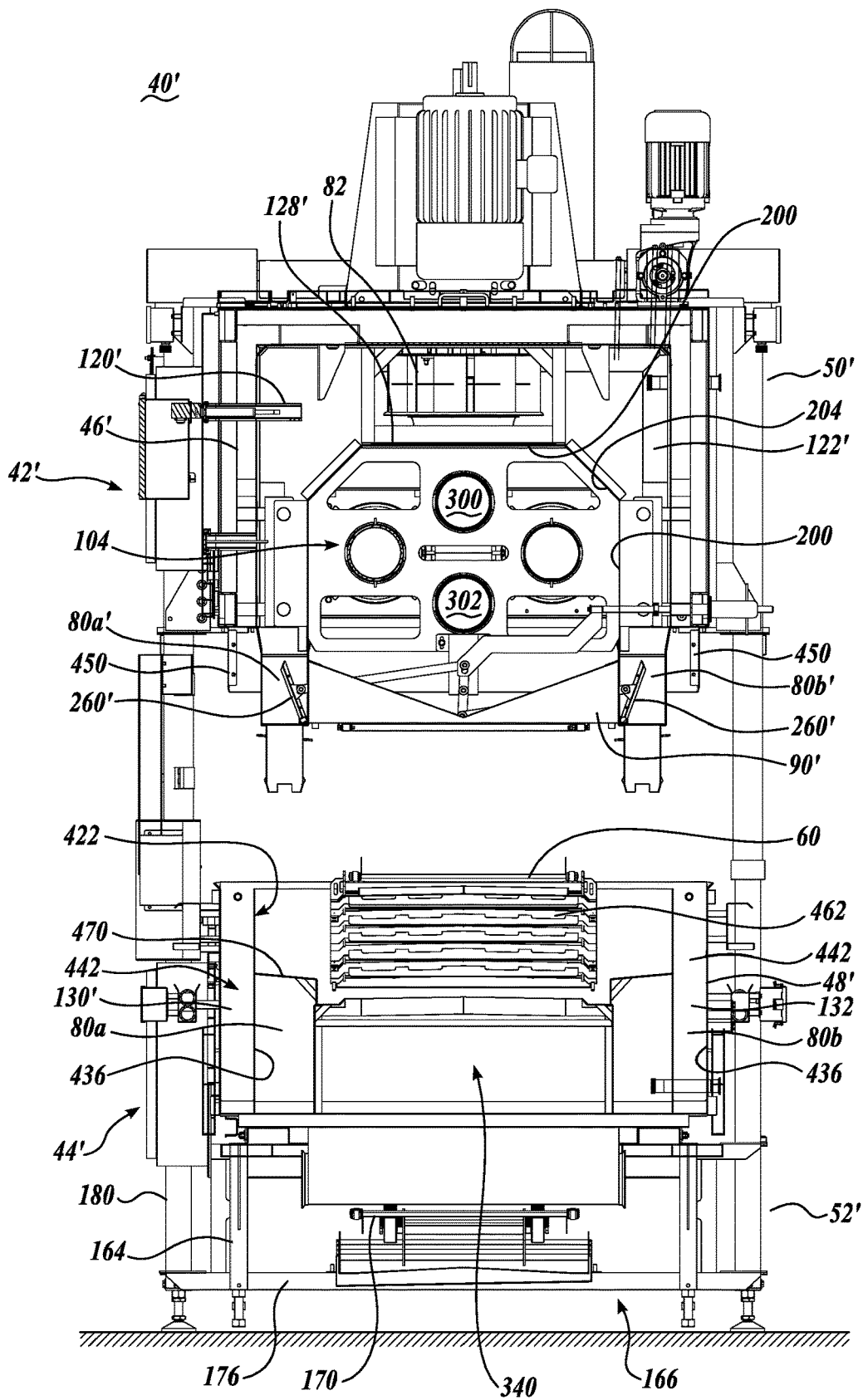
Figure 29:
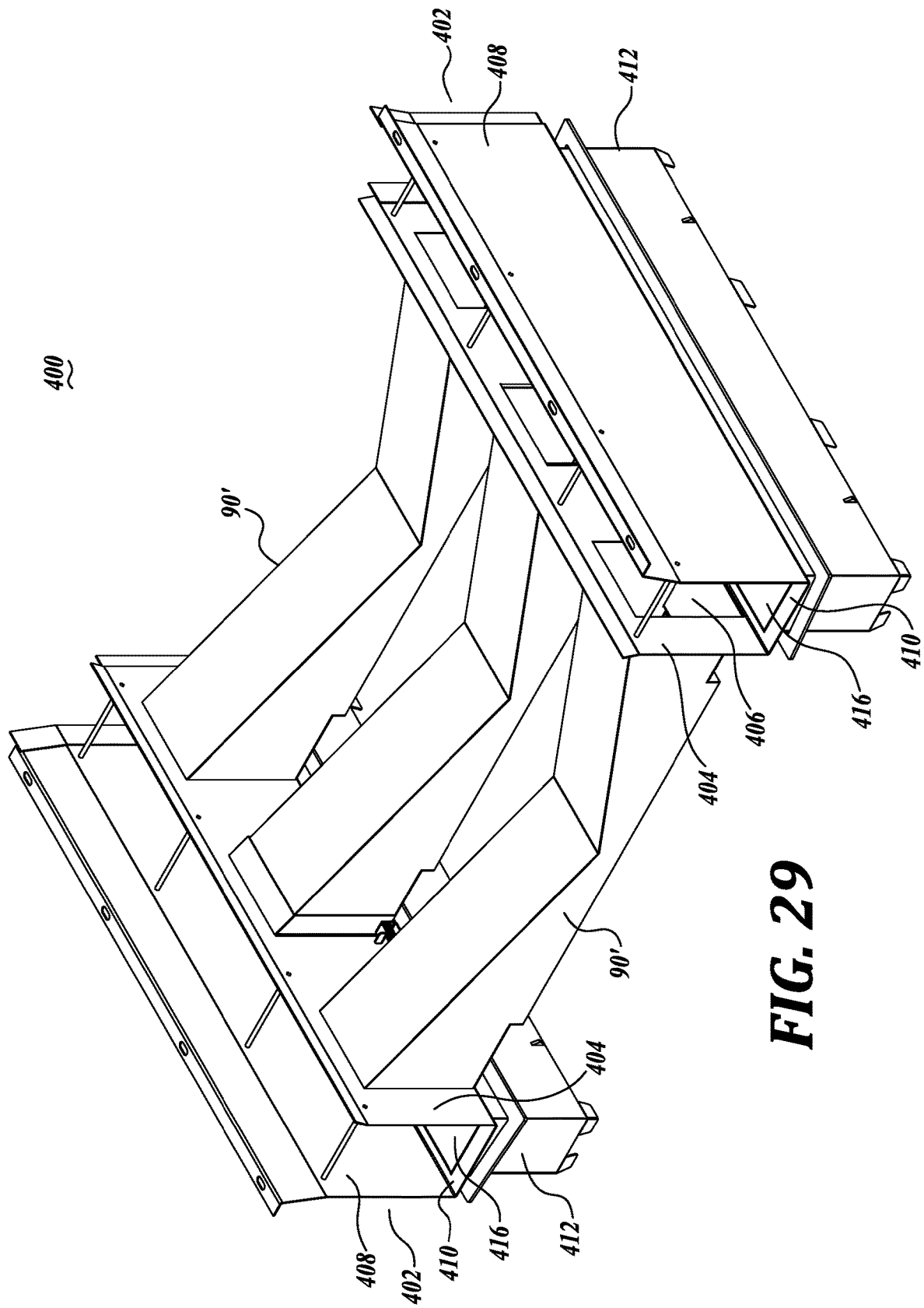
Figure 30:
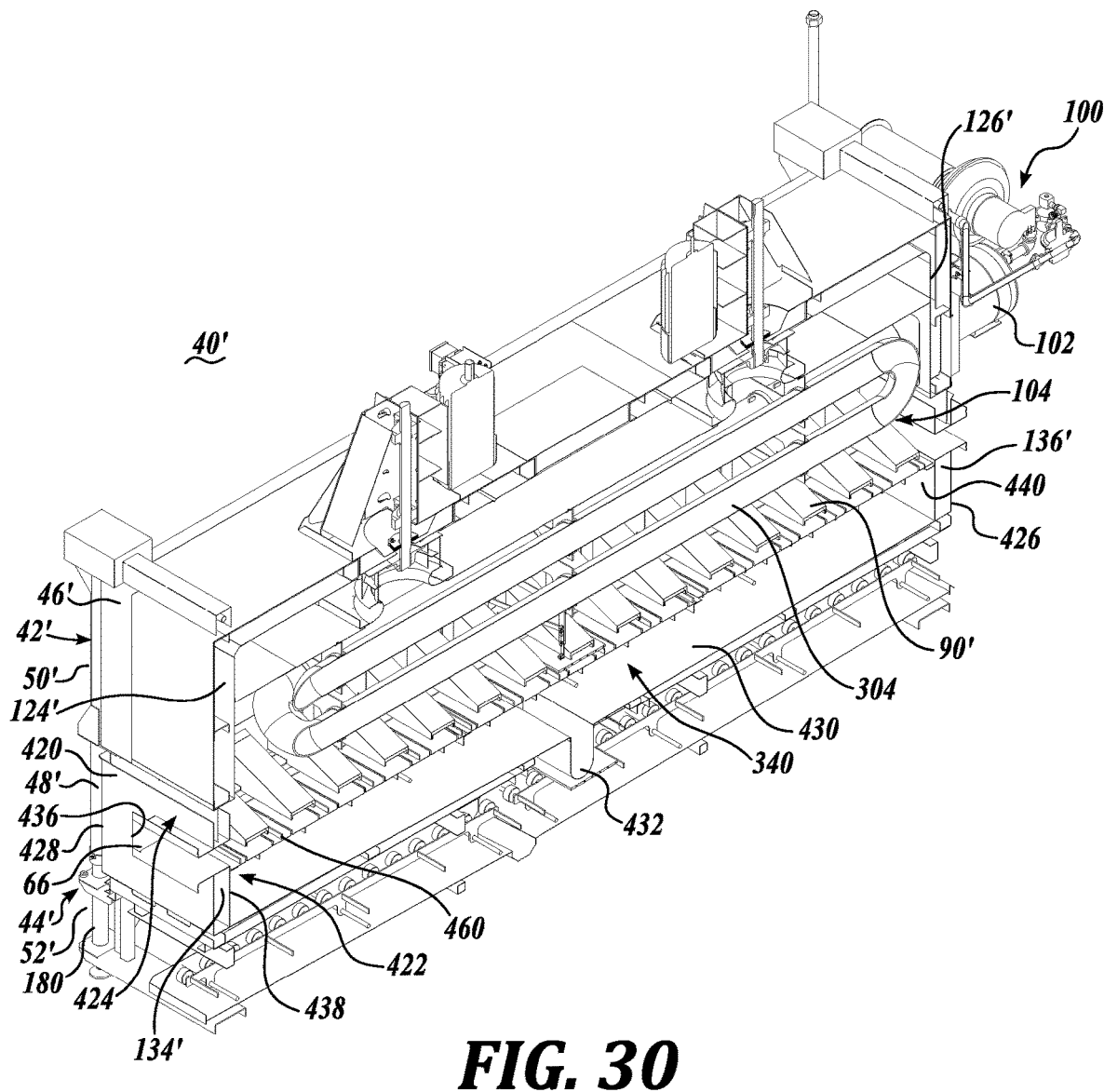
Figure 31:
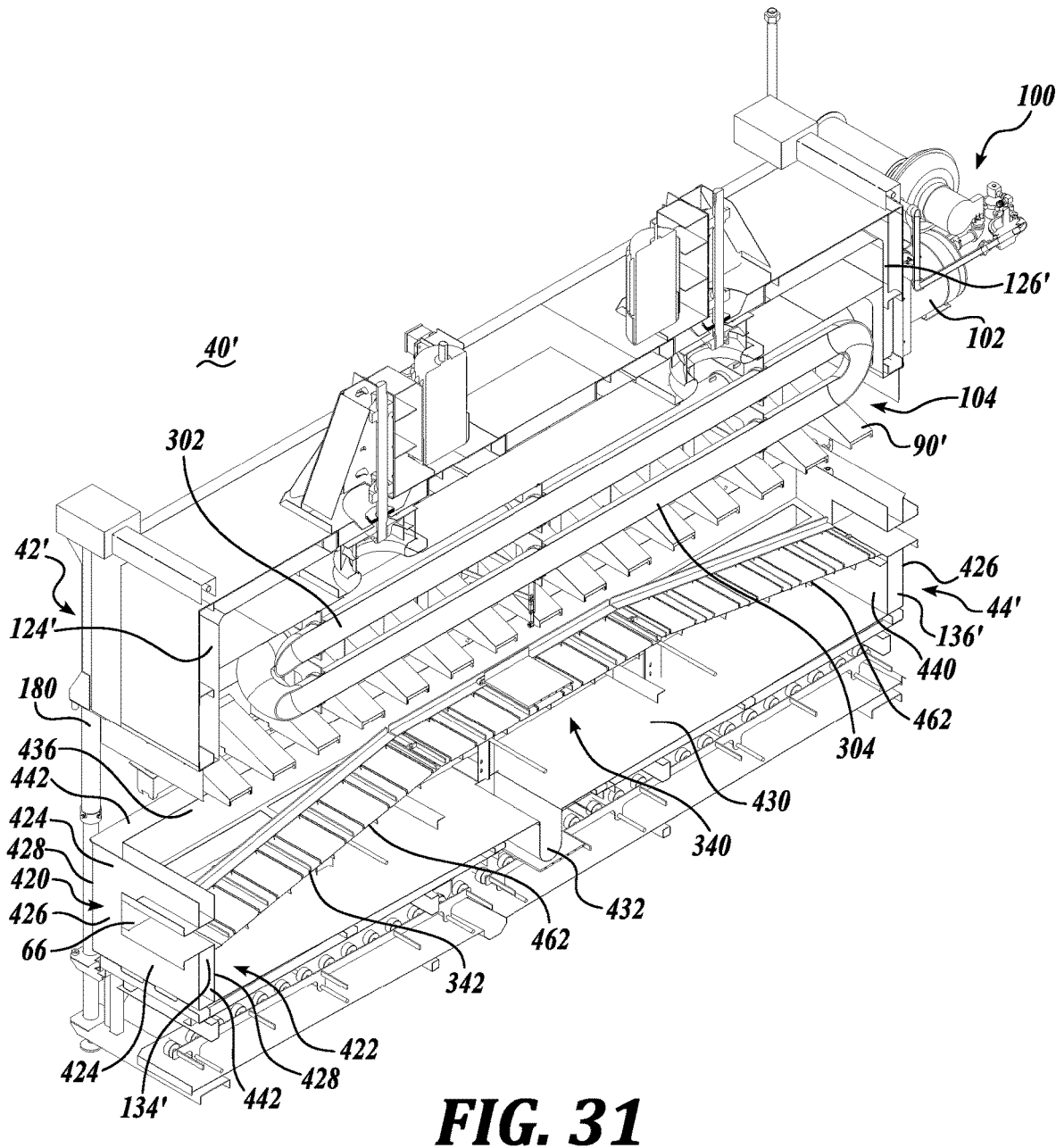
Figure 32:
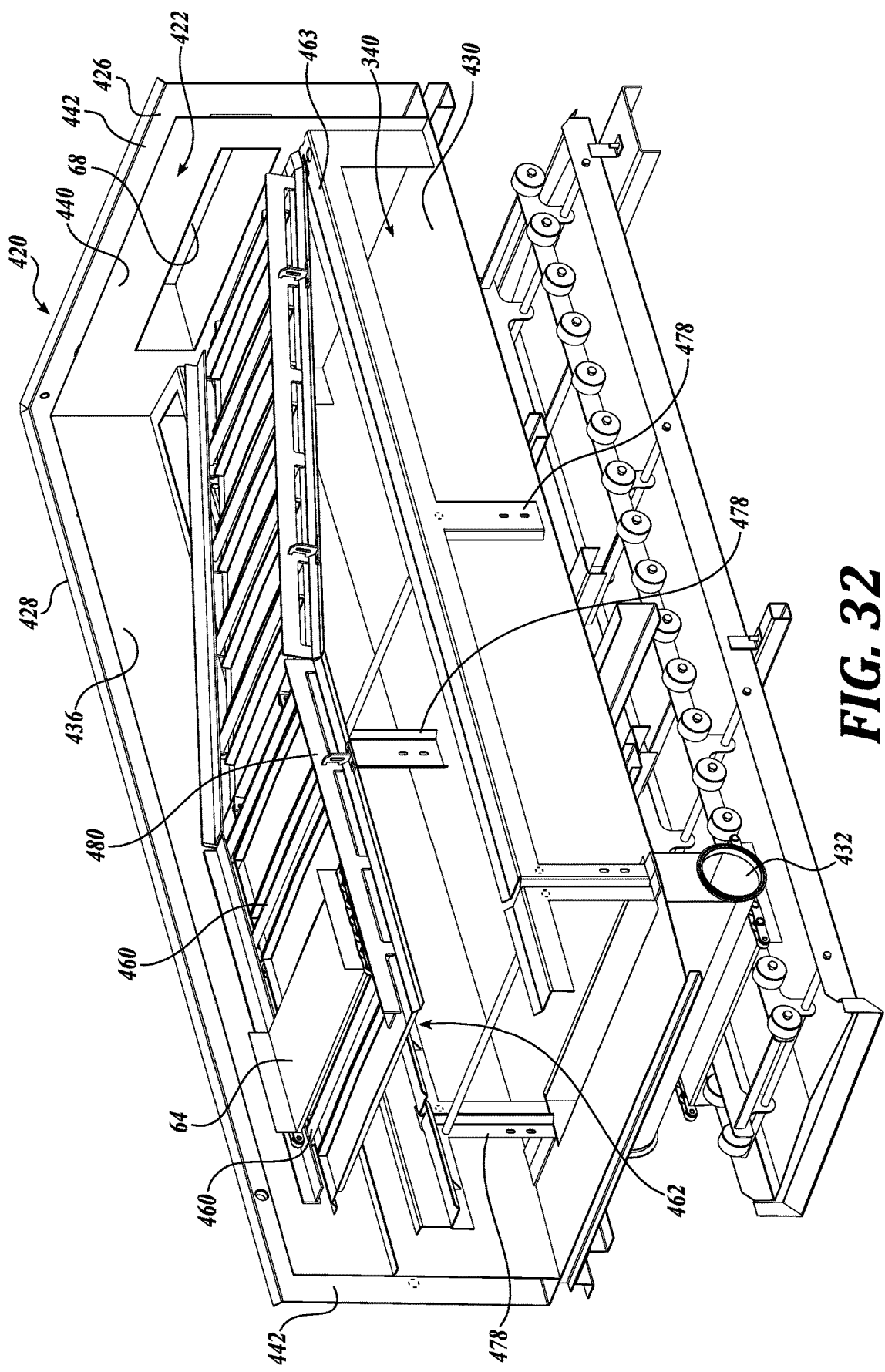
FIG. 32 is an enlarged, fragmentary view of a portion of FIG. 31.

One aspect of FIGS. 20 to 31 that differs from FIGS. 1A to 23 is that the upper distribution ducts are arranged in sets of three rather than individually. FIG. 29 most closely illustrates the three upper distribution ducts 90' arranged together in an assembly or cassette 400. The three distribution ducts 90' span between U-shaped trough structures 402 extending along the sides of the cassette 400. The trough structure 402 has an upright inner wall 404 attached to the ends of the distribution ducts 90'. Openings 406 are formed in the inner wall 404 to correspond to the size and shape of the ends of the distribution ducts 90'. As such, the distribution ducts 90' are open to the trough structures 402. The trough structures also include an outer, upright wall 408, which forms the inside part of the outside wall of supply chambers 80a' and 80b'. Correspondingly, the inner wall 404 of the trough structures 402 forms part of the upper impingement housing section 54' of the oven 40' and thus part of the inside wall of supply chambers 80a' and 80b'. See, for example, FIGS. 27 and 28. The bottom wall or floor 410 of the trough structures 402 are open to downwardly extending male extensions 412 that engage with the lower sections of the supply chambers 80a' and 80b', as shown in FIG. 27.

It will be appreciated that constructing a plurality of distribution ducts 90' into a cassette structure reduces heating medium leakage at the intersection of the upper distribution ducts and the upper supply chamber 80a' since the ends of the upper distribution ducts 90' may be welded or otherwise sealed with respect to the inner wall 404 of the trough structures 402. Moreover, the cassette structures 400 are not so large that they cannot be readily installed into the impingement oven 40' or removed from the oven, for instance, for cleaning, inspection, repair, etc. Also, the ease of removing the cassette structures facilitates viewing into and accessing the interior of impingement oven 40'. Of course, a different number of upper distribution ducts 90' may be included in a single cassette structure 400; such number may depend on the width of the impingement oven 40, and thus the size of the upper distribution ducts 90' in a direction laterally to the conveyor 60.

Next, referring specifically to FIGS. 27, 28, 30 and 31, the base assembly 44' includes a lower housing structure 48' that is constructed with an outer wall structure 420 and an inwardly spaced inner wall structure 422. The outer wall structure 420 includes upright outer side walls 424 and outer end walls 426, 428 that form the exterior of the base assembly 44'. The outer wall structure 420 also includes a bottom wall or floor 430 spanning the entire length and width of the lower housing structure 48'. A transverse trough 432 depends downwardly from the floor 430 and extends transversely of the length of the floor 430. The trough 432 may be centered relative to the length of the bottom wall or at another location intermediate the ends of the bottom wall. The bottom wall 430 is sloped from end walls 426 and 428 toward the trough 432.

The inner wall structure 422 includes side walls 436 spaced inwardly of outer wall 428 and inner end walls 438 and 440 spaced inwardly of outer end walls 426 and 428, respectively. The space between the end and side walls of the outer wall structure 420 and the inner wall structure 422 defines a trough 442 that is nominally filled with water to form a water seal between the hood assembly 42' and base 44'. To this end, as shown in FIGS. 27 and 28, the upper housing structure 46' has a skirt 450 that extends downwardly from the perimeter of the upper housing structure 46' into the trough 442 formed in the lower housing structure. Accordingly, a water seal is created at the intersection of the skirt 450 and the water within the trough 442, thereby to prevent leakage of cooking medium from the supply chambers 80*a*' and 80*b*'.

Typically, there are up to several hundred gallons of water within the trough 442. In accordance with the present disclosure, rather than simply draining the trough at the end of a production run or shift, when the impingement oven is typically cleaned, the water within the trough 442 is collected and used to wash or otherwise clean the impingement oven. The cleaning process typically includes washing the interior of the oven with a caustic solution, which may also include a detergent. Thereafter, a neutralizing wash/rinse is applied to the interior of the oven and thereafter optionally followed by a clean water rinse of the interior of the oven. The sealing water from the trough 442 could be utilized in the first and/or second wash cycles. In this regard, the water from the tank may be first filtered before being used to wash the interior of the impingement oven. As is known in the art, applicable piping and fixtures, including nozzles, may be positioned within the interior of the upper and lower housing structures 46' and 48' to direct the washing and cleaning solutions to the components of the impingement oven 40'.

One difference between the impingement oven 40' relative to the impingement oven 40, as described above, is that the impingement oven 40' does not use a lower distribution chamber in the form of distribution ducts, such as ducts 92, 92*a*, 92*b* or 92*c*, described above. Instead, impingement cooking medium is directed upwardly toward the conveyor upper run 64 via a plenum chamber 340 positioned beneath the conveyor upper run. The cooking medium is directed upwardly toward the conveyor system run 64 through narrow openings 342 extending transversely to the length of rectangularly shaped impingement plates 462 extending beneath the lower run of the conveyor and forming the top of the plenum chamber 340. The impingement plates 462 are supported by brackets 463 extending along the inside surface of supply chamber wall 464, which is spaced inwardly and extends parallel to inner wall 436 of the inner wall structure 422. Thus, as shown in FIGS. 27 and 28, the walls 436 and 464 form the lower sections of supply chambers 80*a*' and 80*b*'.

As discussed above, a sealing system is provided between the supply chamber sections corresponding to the hood assembly 44 and the supply chamber sections corresponding to the base assembly 44. In this regard, as noted above, male extensions 412 extend downwardly from the bottom wall or floor 410 of trough structures 402. The extensions 412 extend through close-fitting openings formed in a top wall 410 extending across the lower sections of the supply chambers 80*a*' and 80*b*'. A seal may be provided around the openings of the top wall 470 to reduce heating medium leakage between the lower sections of supply chambers 80*a*' and 80*b*' and the extensions 412 of the cassettes 400. The extensions 412 are generally rectangular in shape and open at the top to correspond with openings 416 formed in the trough bottom wall 410. Likewise, the bottom of the extensions 412 are also open for the free flow of heating medium downwardly into the lower sections of supply chambers 80*a*' and 80*b*'.

The pressurized heating medium, flowing downwardly into the lower sections of the supply chambers 80*a* and 80*b*, once below the surface of the impingement plates 462, then flows laterally inwardly as shown by arrow 474. The sides of the supply chamber 80*a*' and 80*b*' are open in the lateral direction beneath the impingement plates 462 so that the pressurized cooking medium is free to flow beneath the impingement plates 462 and then upwardly through the impingement plate openings 342 to direct the impingement cooking medium to the underside of conveyor upper run 64, as illustrated by arrows 476. It will be appreciated that the lateral sides of the lower plenum chamber 340 are open except for support legs 478 spaced apart along the lower impingement housing section 56 to support the brackets that carry the impingement plates 462.

As described above with respect to the embodiment of the present disclosure shown in FIGS. 1A to 23, the impingement medium directed upwardly toward the underside of the conveyor upper run 64 returns to the blower 82 by traveling upwardly between the upper distribution ducts 90. It will be appreciated that the construction of the base assembly 44' with the impingement plates 462 is much simplified from the construction of the lower housing structure 48 described above.

Figure 24:
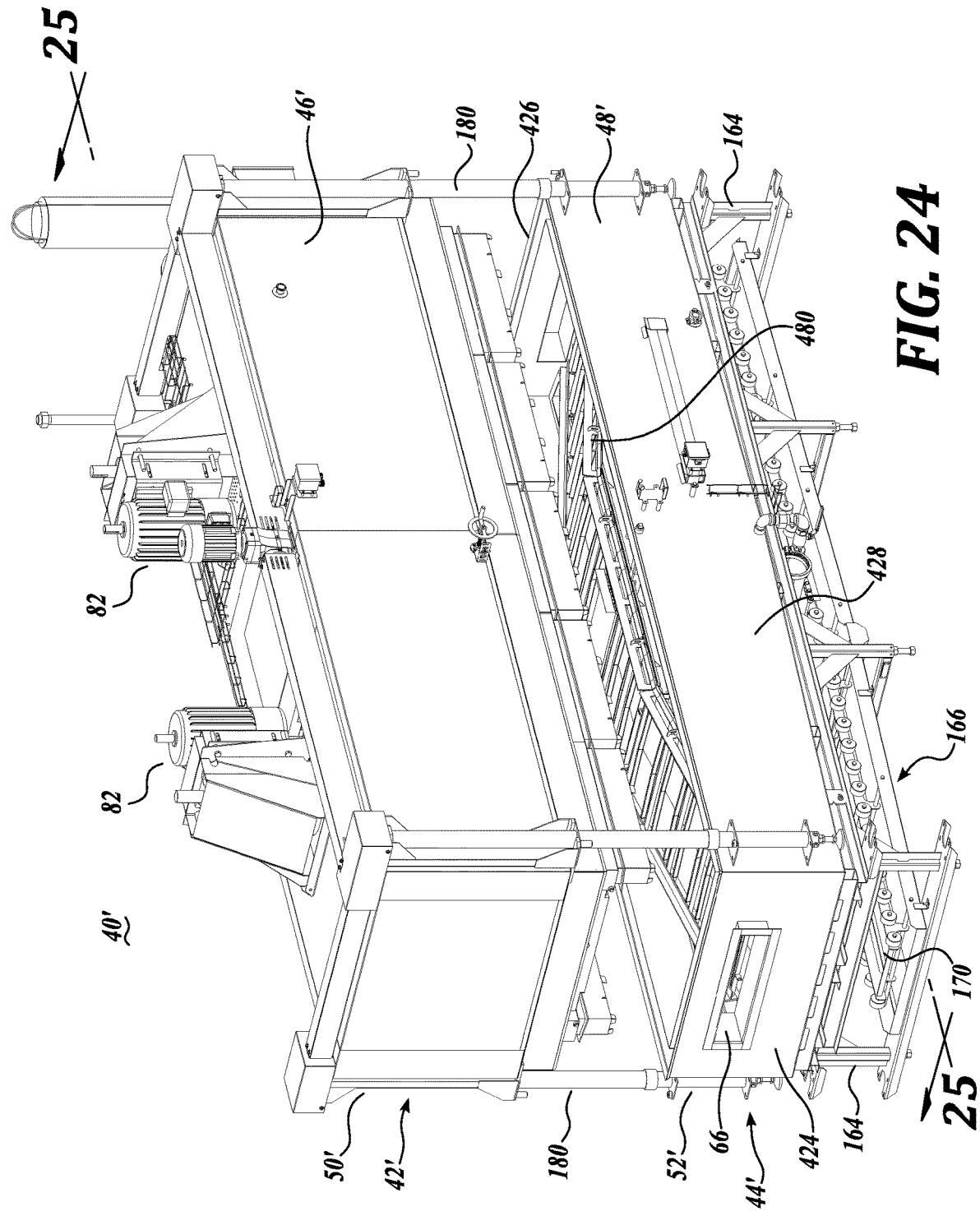
Figure 25:
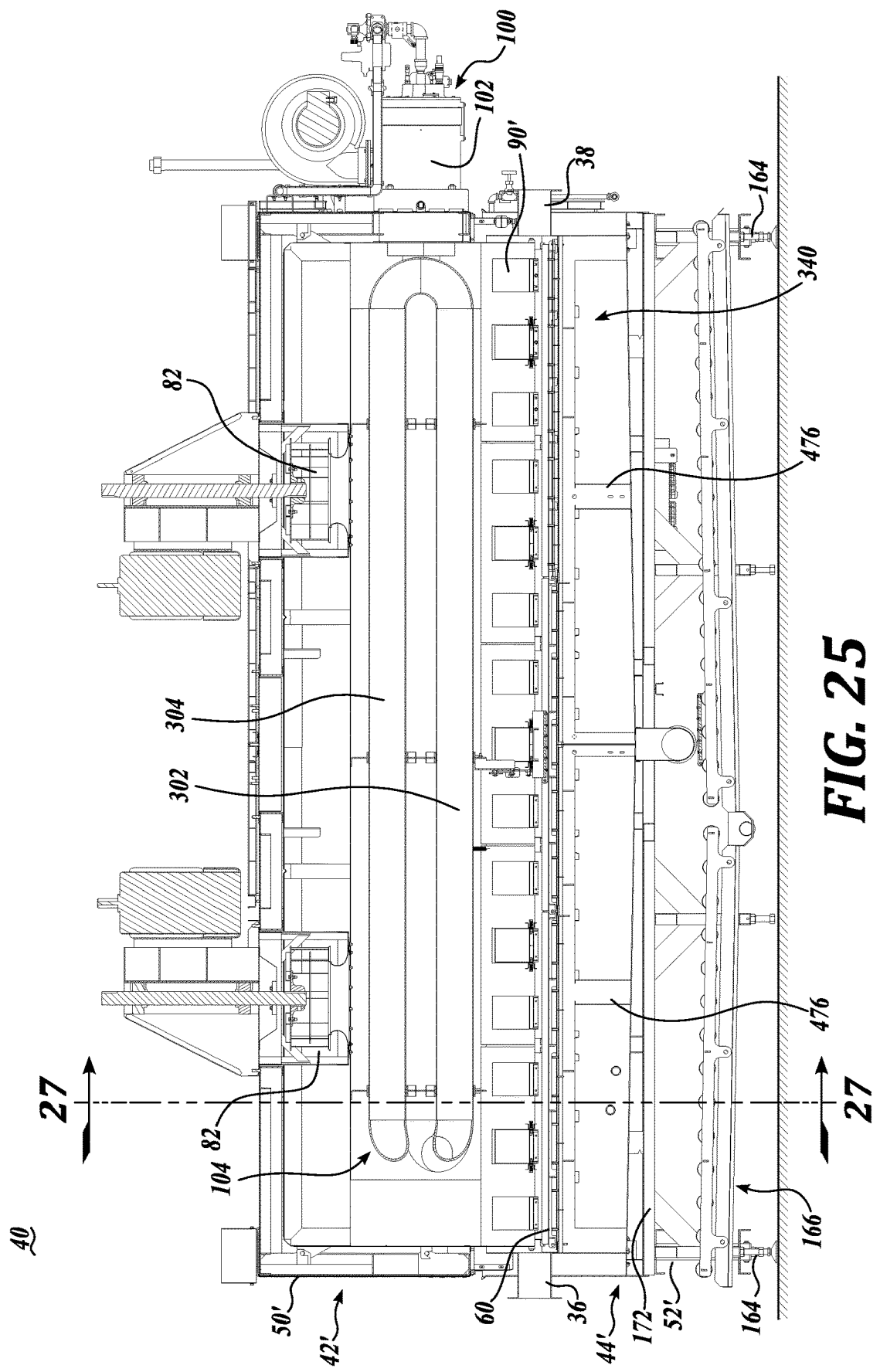

A further aspect to the present disclosure is perhaps most clearly illustrated in FIGS. 24, 26, 31 and 32, wherein when the upper housing structure 46' is retracted, the impingement plates 462 are also lifted upwardly together with the conveyor side rails 480. In this regard, the impingement plate 462 may be constructed in three sections, with a middle section that is connected to the upper housing structure 46 through cables, chains, or other connections (not shown) so that when the hood assembly 42' is retracted upwardly, the center section of the impingement plates 462 and corresponding portions of the conveyor track 480 are lifted upwardly to a certain extent, as illustrated in FIGS. 24 and 26. This provides access to the interior of the base assembly 44' to facilitate inspection and cleaning of the impingement oven 40', which otherwise would be difficult to not only access, but also to view. The construction of the lower oven 40' with a lower plenum chamber of "open construction" using segmented impingement plates 462 also facilitates access to the lower portion of the oven. This construction of the lower plenum oven also reduces the leakage of the cooking medium that typically would occur with the use of a large number of finger ducts to direct the cooking medium to the underside of the conveyor belt upper run 64. Because the finger ducts typically need to be removable, leakage of medium occurs at the connection between the inlet ends of the finger ducts and the supply chamber/plenum of prior impingement ovens.

Figure 20:
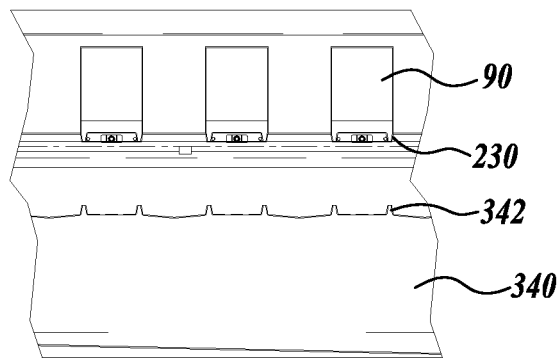
FIGS. 20 to 31 illustrate a further embodiment to the present disclosure. In this regard.
Figure 21:
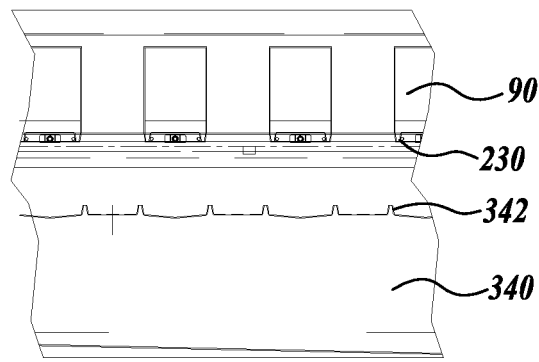

FIGS. 20, 21, 22, and 23 show that various possible combinations of upper distribution ducts 90 or 330 may be employed with different configurations of lower plenum chamber 340. As shown in FIG. 20, the nozzles 342 of plenum chamber 340 are lined with the nozzle 230 of the upper distribution ducts 90. The nozzles 234 extend in the upward direction relative to the impingement plate 462 of the plenum chamber 340. FIG. 21 shows a configuration similar to that of FIG. 20; however, the nozzles 342 of the plenum chamber 340 are staggered with respect to the nozzles 230 of the distribution ducts 90.

Figure 22:
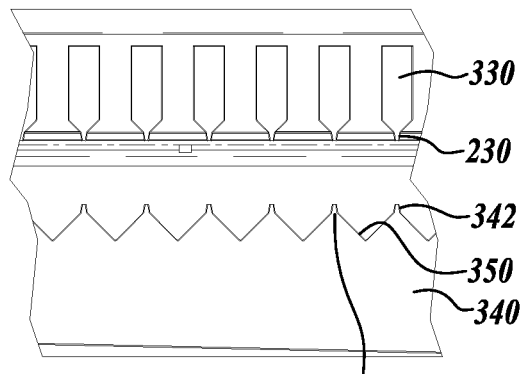
Figure 23:
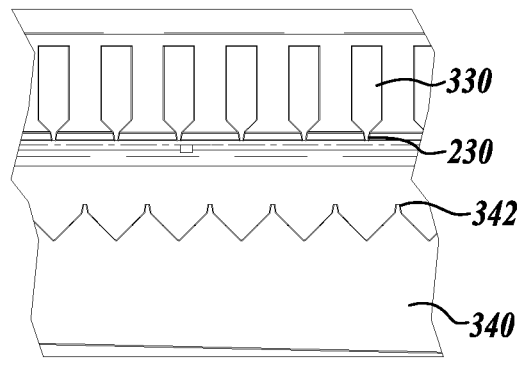

FIGS. 22 and 23 illustrate a plenum chamber 340 of a somewhat different construction than the plenum chamber shown in FIGS. 20 and 21. In FIGS. 22 and 23, the impingement plate 462 of the plenum chamber 340 is constructed with a saw-tooth shaped profile extending lengthwise of the plenum chamber 340 and thus lengthwise of the impingement oven 40. By this configuration of the impingement plate, valleys 350 are formed between adjacent peaks 352 at which the nozzles 342 are located. The valleys 350 can serve as collection locations for renderings or other liquid from the food products being processed. The valleys 350 can be somewhat crowned along the transverse center of the plenum so that renderings or other liquids from the processed food products flow toward each side of the plenum chamber and then down toward the bottom of the lower housing structure 48' for collection. By this construction, the likelihood of the renderings or other liquid released by the food product being combusted and thereby starting a fire within the impingement oven is reduced. In FIG. 22, the nozzles 342 are in alignment with the nozzles 230 directed downwardly from singular distribution ducts 330. In FIG. 23, the plenum chamber nozzles 342 are staggered between the nozzles 230 of adjacent singular distribution ducts 330.

It will be appreciated that the configuration of the impingement oven 40' with the use of the upper distribution duct cassettes 400 and the lower plenum chamber 340 also results in very little pressure loss in the heated cooking medium as the medium circulates from blower 82 through the supply chambers 80a and 80b, through the upper distribution cassette structure 400, and through the lower plenum chamber 340, and back to the blower 82. Applicants have found virtually no duct friction loss in the circulating cooking medium. As can be appreciated, this results in high energy efficiency of the impingement system disclosed.

While preferred embodiments of the present disclosure has been illustrated and described, it will be appreciated that various changes can be made therein without departing from the spirit and scope of the invention. In this regard, although particular constructions of the supply chambers 80a and 80b are described and illustrated, it is to be understood that the supply chambers can be of other constructions and still perform the functions and provide the benefits of supply chambers 80a and 80b. Also, other configurations of the valves/dampers 260 can be utilized or even other methods or systems employed to control the proportion or volume of cooking medium entering the upper distribution ducts 90 relative to the lower distribution ducts 92 or lower plenum chamber 340.

Further, the fans/blowers 82 can be positioned elsewhere than described above and still direct the heated impingement medium to the supply chambers 80a and 80b. For example, the fans/blowers 82 can be positioned at the bottom of impingement housing 62 or located to push the air through the impingement housing rather than draw or pull the air from the impingement housing.

Moreover, different systems could be employed to heat the cooking medium than described above. For example, a hot oil heater could be employed in fluid flow communication with the impingement oven 40, 40' to heat oil and then thermal fluid Fin-tubed heat exchangers could be used to heat the cooking medium for circulation through the impingement ovens 40 and 40'. Of course, finless tube-type heat exchangers may also be employed. The heat exchangers can be located in the impingement oven at the location of the ducts 300-306, described above. Alternatively the heat exchangers could be located on each side of the blower 82 slant at the top of the supply chambers 80a and 80b. The positioning of the heat exchangers within the supply chamber would be made so as to minimize pressure drop as the heating medium flows across the heat exchangers.

The embodiments of the invention in which an exclusive property or privilege is claimed are defined as follows:

1. An impingement apparatus for thermally processing work products transported on a conveyor with a thermal processing impingement medium, comprising:
    an outer housing extending the length of the impingement apparatus and having side portions;
    an impingement housing disposed within the outer housing, the impingement housing extending the length of the outer housing and having side portions;
    wherein the side portions of the outer housing and the side portions of the impingement housing are configured to cooperatively define supply chambers extending along both exterior sides of the impingement housing and the corresponding interior sides of the outer housing for circulation of the thermal processing impingement medium;
    distribution chambers extending laterally from the two supply chambers to direct the thermal processing impingement medium toward the conveyor;
    wherein the distribution chambers are in fluid flow communication simultaneously with the two supply chambers;
    wherein the distribution chambers are in the form of a plurality of separate elongate distribution ducts that extend across the conveyor, the distribution ducts having end openings adjacent the two supply chambers and in fluid flow communication with the two supply chambers, the distribution chambers decrease in cross-sectional area in the directions laterally away from the two supply chambers to a minimum cross-sectional area at the transverse center of the conveyor, the distribution ducts configured to direct the thermal processing impingement medium toward the longitudinal center of the conveyor from both distribution chambers,
    wherein the plurality of separate laterally extending distribution ducts are spread apart from each other along the length of the conveyor;
    a heating system disposed within the impingement housing above the distribution ducts to heat the impingement medium, the heating system comprising a heat exchanger extending the length of the impingement housing overhead of the distribution ducts; and
    at least one circulation fan positioned overhead of the heat exchanger to draw the thermal processing impingement medium up through the heat exchanger and then force the thermal processing impingement medium directly down into the two supply chambers, the at least one circulation fan in unobstructed flow communication with both supply chambers.

2. The impingement apparatus according to claim 1, wherein the distribution chambers are in fluid flow communication with the supply chambers at two spaced apart locations along the supply chambers.

3. The impingement apparatus according to claim 1, wherein the circulation fan is disposed between the supply chambers.

4. The impingement apparatus according to claim 1, further comprising upper distribution ducts positioned above the conveyor and lower distribution ducts positioned beneath the conveyor.

5. The impingement apparatus according to claim 4, further comprising an adjustable-position diverter located in the supply chambers and adjustable to control the flow of thermal processing impingement medium flowing through the supply chamber to apportion the volume of thermal processing impingement medium that enters the upper distribution ducts versus the lower distribution ducts.

6. The impingement apparatus according to claim 1, wherein:
the distribution chambers are disposed above the conveyor; and
further comprising a lower plenum chamber positioned beneath the conveyor and in thermal processing impingement medium flow communication with the supply chambers.

7. The impingement apparatus according to claim 6, further comprising adjustable position diverters located in the supply chambers that are operable to control the proportion of thermal processing impingement medium flowing through the supply chambers from the heating system that enters the distribution ducts versus the proportion of thermal processing impingement medium that enters the lower plenum chamber.

8. The impingement apparatus according to claim 6, wherein the distribution chambers have outlets extending across the conveyor that direct at least one wall of thermal processing impingement medium toward the conveyor.

9. The impingement apparatus according to claim 6, wherein the lower plenum chamber comprises one or more outlets that direct the thermal processing impingement medium in one or more streams towards the underside of the conveyor.

10. The impingement apparatus according to claim 6, wherein the lower plenum chamber is substantially open to the two supply chambers.

11. The impingement apparatus according to claim 1, wherein the distribution chambers are configured to expel at least one wall of thermal processing impingement medium extending across the path of the conveyor and toward the conveyor.

12. The impingement apparatus according to claim 1, wherein a plurality of distribution ducts are arranged as a unit along a longitudinal cassette structure, the cassette structure having side walls forming a part of the impingement housing, the cassette structure removably positionable into the impingement apparatus.

13. The impingement apparatus according to claim 1, comprising:
an upper impingement housing section;
a lower impingement housing section; and
a structurally separate cassette structure comprising the distribution chambers, the cassette structure defining a portion of the impingement housing between the upper and lower impingement housing sections, the cassette structure disposable within the outer housing to position the distribution ducts in fluid flow communication with the supply chambers.

14. An impingement oven for thermally processing, with a heated impingement medium, food products being transported on a longitudinal conveyor, comprising:
a longitudinal impingement housing through which the conveyor passes, the impingement housing extending the length of the impingement oven;
supply chambers disposed on both longitudinal sides of the impingement housing;
a blower system for blowing thermal processing impingement medium into the two supply chambers;
a plurality of separate distribution ducts each extending laterally from both supply chambers to direct thermal processing impingement medium from both supply chambers toward the longitudinal center of the conveyor, the distribution ducts having end opening adjacent the supply chambers and in fluid flow communication with the two supply chambers;
the distribution ducts are reduced in cross-sectional area from the end openings in the directions away from the two supply chambers to a minimum cross-sectional area at the transverse center of the conveyor;
the plurality of the laterally disposed distribution ducts are arranged side-by-side along the length of the longitudinal impingement housing;
a heating system disposed within the impingement housing above the distribution ducts to heat the impingement medium, the heating system comprising a heat exchanger extending the length of the impingement housing overhead of the distribution ducts; and
the blower system located above the heating system and overhead of the heat exchanger for drawing the impingement medium up through the heat exchanger and directing the impingement medium directly into the two supply chambers, the blower system in unobstructed flow communication with the two supply chambers.

15. The impingement oven according to claim 14, further comprising upper distribution ducts positioned above the conveyor and lower distribution ducts positioned beneath the conveyor.

16. The impingement oven of claim 14, wherein the laterally disposed distribution ducts are arranged in spaced apart side-by-side relationship to each other.

17. The impingement apparatus of claim 1, wherein the at least one circulation fan is positioned above the impingement housing.

18. The impingement oven of claim 14, wherein the at least one circulation fan is positioned above the impingement housing.

19. The impingement apparatus according to claim 1, wherein the heating system comprising a heat source disposed exterior to the outer housing for supplying heated medium to the heat exchanger.

20. The impingement apparatus according to claim 14, wherein the heating system comprising a heat source disposed exterior to the impingement housing for supplying heated medium to the heat exchanger.

21. An impingement oven for thermally processing, with a heated impingement medium, food products being transported on a longitudinal conveyor, comprising:
a longitudinal impingement housing through which the conveyor passes, the impingement housing extending the length of the impingement oven;

supply chambers disposed on both longitudinal sides of the impingement housing;

a blower system for blowing thermal processing impingement medium into the two supply chambers;

a plurality of the laterally disposed distribution ducts are arranged side-by-side along the length of the longitudinal impingement housing;

each distribution duct extending laterally from one of the supply chambers to direct thermal processing impingement medium transversely across the conveyor, each distribution duct having an end opening adjacent a corresponding supply chamber for fluid flow communication with the corresponding supply chamber;

each distribution duct is reduced in cross-sectional from the end opening end in the direction away from the corresponding supply chamber;

each distribution duct in alternating flow communication from supply chamber on opposite longitudinal side of the impingement housing;

a heating system disposed within the impingement housing above the distribution ducts to heat the impingement medium, the heating system comprising a heat exchanger extending the length of the impingement housing overhead of the distribution ducts; and the blower system located above the heating system and overhead of the heat exchanger for drawing the impingement medium up through the heat exchanger and directing the impingement medium directly into the two supply chambers, the blower system being in unobstructed flow communication with the two supply chambers.

* * * * *